US008550013B2

(12) United States Patent
    Carnevali

(10) Patent No.: US 8,550,013 B2
(45) Date of Patent: Oct. 8, 2013

(54) LOCKING ELECTRONICS PLATFORM

(76) Inventor: Jeffrey D. Carnevali, Seattle, WA (US)

( * ) Notice: Subject to any disclaimer, the term of this patent is extended or adjusted under 35 U.S.C. 154(b) by 726 days.

(21) Appl. No.: 12/002,445

(22) Filed: Dec. 17, 2007

(65) Prior Publication Data

US 2008/0093514 A1   Apr. 24, 2008

Related U.S. Application Data

(63) Continuation-in-part of application No. 11/120,286, filed on May 2, 2005, now Pat. No. 7,523,911, which is a continuation-in-part of application No. 11/118,734, filed on Apr. 29, 2005, now Pat. No. 7,802,768.

(51) Int. Cl.
    *A47B 11/00*   (2006.01)
(52) U.S. Cl.
    USPC ................ 108/143; 108/137; 248/346.03
(58) Field of Classification Search
    USPC ............. 248/346.03, 346.04, 346.06, 298.1,
                248/222.13; 108/143, 65, 102, 137;
                361/679.02, 679.26, 679, 679.39; 269/43,
                                    269/45, 55, 289 R, 291
    See application file for complete search history.

(56) References Cited

U.S. PATENT DOCUMENTS

| 2,291,747 A | 8/1942 | Neuwirth |
| 2,643,143 A | 6/1953 | Bergqvist |
| 2,850,308 A | 9/1958 | LeFebvre et al. |
| 3,004,743 A | 10/1961 | Wenger |
| 4,230,335 A * | 10/1980 | Glassmeyer ............... 280/476.1 |
| 4,928,916 A | 5/1990 | Molloy |
| 4,976,721 A | 12/1990 | Blasnik |
| 5,232,304 A | 8/1993 | Huang |
| 5,897,268 A | 4/1999 | Deville |
| 6,959,899 B2 * | 11/2005 | Yeh ........................... 248/346.03 |
| 7,032,872 B2 * | 4/2006 | Sullivan ................... 248/346.07 |
| 7,537,190 B2 * | 5/2009 | Fan ............................ 248/309.1 |

* cited by examiner

*Primary Examiner* — Alfred J Wujciak
(74) *Attorney, Agent, or Firm* — Charles J. Rupnick Attorney at Law

(57) ABSTRACT

A telescoping electronics mounting platform having a pair of cooperating frame members. An interlocking mechanism is coupled between the frame members and includes: relatively slidable male and female members coupled to the different frame members, a reaction surface formed relative to the second frame member, an actuator coupled to the male member and having a drive surface that is positioned adjacent to the reaction surface of the second frame member wherein the male member is responsive to a motion of the drive surface of the actuator relative to the reaction surface for moving relative to the female member, and an expandable locking mechanism coupled to between the male and female members, wherein the expandable locking mechanism is responsive to the motion of the actuator relative to the reaction surface for expanding within the female member.

18 Claims, 24 Drawing Sheets

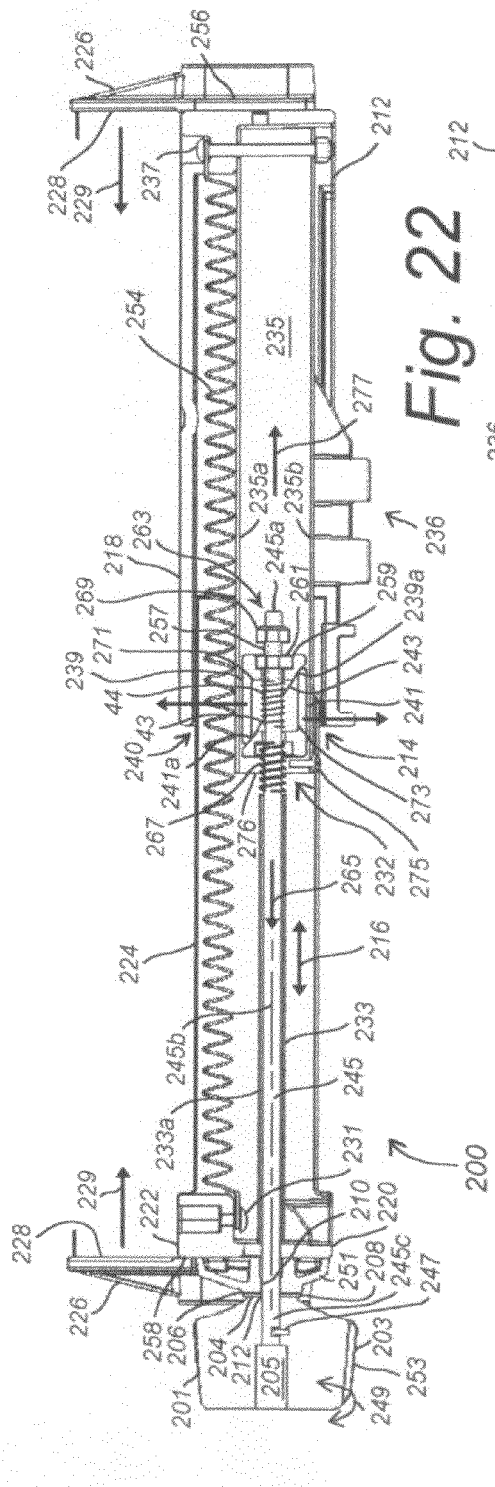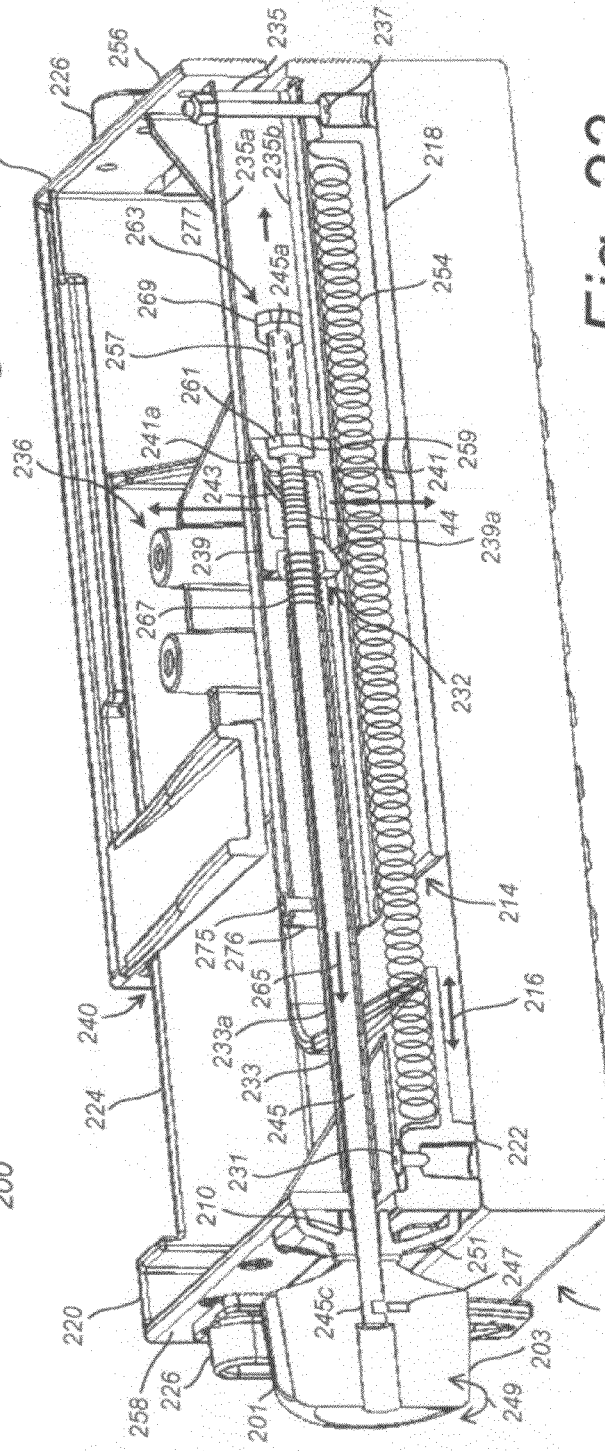

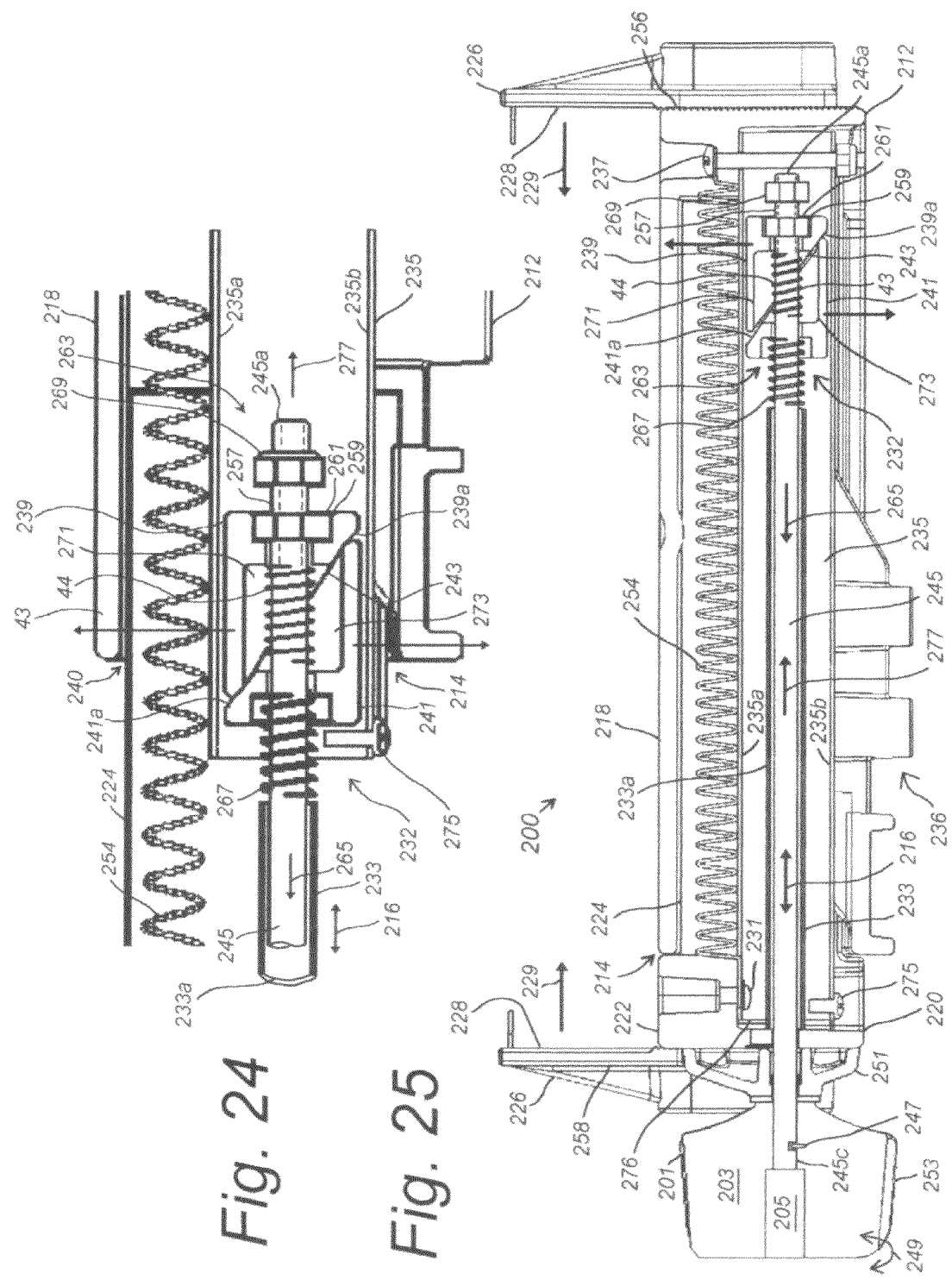

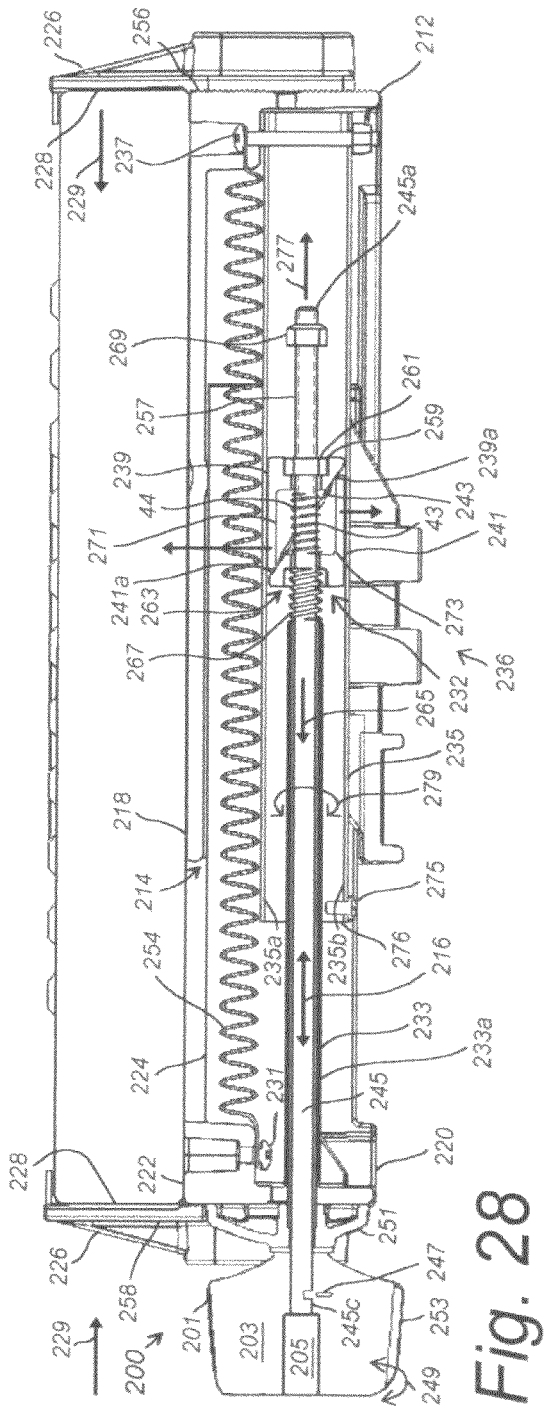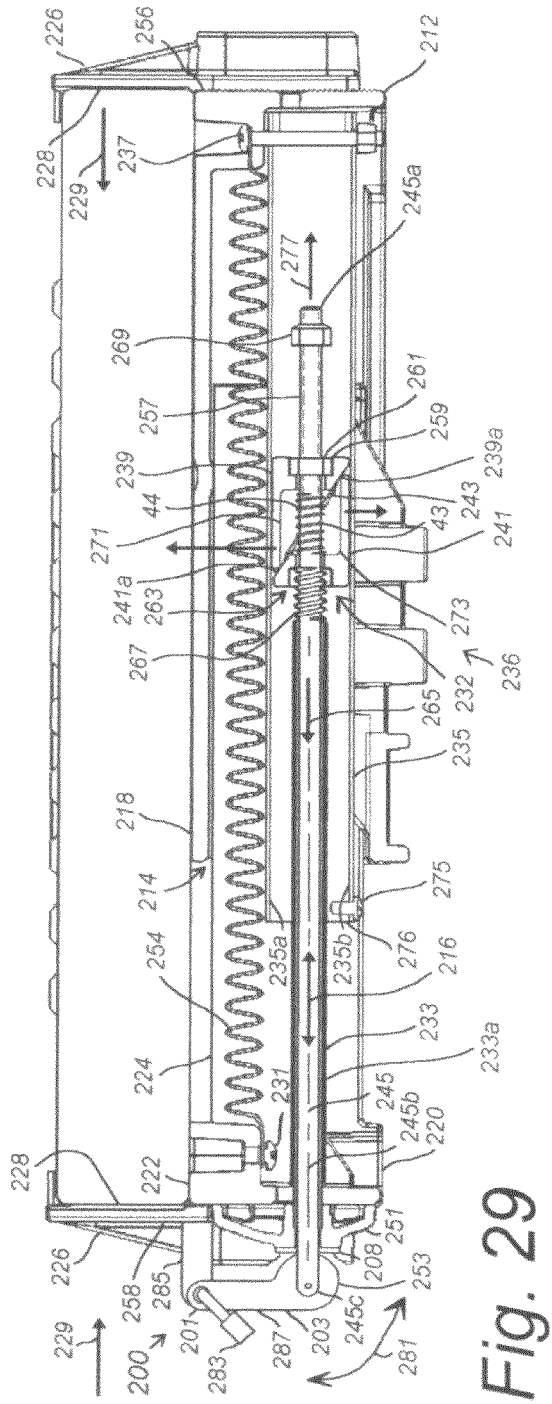

LOCKING ELECTRONICS PLATFORM

This application is a Continuation-in-part and claims priority benefit of parent U.S. patent application Ser. No. 11/120,286 filed in the name of Jeffrey D. Carnevali on May 2, 2005 now U.S. Pat. No. 7,523,911, which is a Continuation-in-part and claims priority benefit of parent U.S. patent application Ser. No. 11/118,734 filed in the name of Jeffrey D. Carnevali on Apr. 29, 2005 now U.S. Pat. No. 7,802,768, the complete disclosures of which are both incorporated herein by reference.

FIELD OF THE INVENTION

The present invention relates to trays for holding portable devices, and in particular to locking trays for holding portable electronic devices, including lap top computers and other similarly sized electronics devices.

BACKGROUND OF THE INVENTION

Lengthwise locking mechanisms for telescoping pole devices are generally well known. However, such known lengthwise locking mechanisms in general tend to fail when any portion of the telescoping pole is rotated relative to another portion thereof. Subsequently, the telescoping portions of the pole become unlocked, and slide one within the other, thereby releasing the locking mechanism.

Furthermore, it is known to provide mounting platforms that can accommodate the limited available space normally found in a vehicle for mounting add-on equipment. These mounting platforms must be able to handle the load of the accessory device in the vibration and shock environment encountered in a moving vehicle while still permitting the accessory device to be quickly and easily installed in the mounting platform. The mounting platform itself must be easily and quickly universally adjustable to provide maximum positional flexibility. The mounting platforms must also accommodate the various shapes of accessory devices being installed, while conforming to the limited, generally oddly-shaped space available in which to mount the platform and the accessory device. Various mounting platforms are currently in use of different configurations that mount either on the vehicle's center console or dash board. However, security of the accessory device remains uncertain.

Consequently, it is desirable to have improvements in the lengthwise locking mechanisms of telescoping poles, and in particular as applied to mounting platforms for accessory devices.

SUMMARY OF THE INVENTION

The present invention overcomes limitations of the prior art by providing a telescoping electronics mounting platform having an internal locking mechanism for securing the accessory device within the mounting platform, and a disengaging mechanism for disengaging the internal locking mechanism and releasing the accessory device.

According to one aspect of the invention, the telescoping electronics mounting platform of the invention includes a pair of cooperating frame members that are relatively movable along a first direction, at least one of the frame members having a device mounting surface positioned relative to the first direction. An interlocking mechanism is coupled between the first and second frame members, the interlocking mechanism including: a female member coupled to a first one of the frame members, a male member coupled to a second one of the frame members, the male member being slidable relative to the female member, a reaction surface formed relative to the second frame member, an actuator coupled to the male member and having a drive surface thereon that is positioned adjacent to the reaction surface of the second frame member wherein the male member is responsive to a motion of the drive surface of the actuator relative to the reaction surface of the second frame member for moving relative to the female member, and an expandable locking mechanism coupled to the male member and being nominally slidable within the female member wherein the expandable locking mechanism is responsive to the motion of the drive surface of the actuator relative to the reaction surface of the second frame member for expanding within the female member.

According to another aspect of the telescoping electronics mounting platform, the interlocking mechanism further includes a disengageable interlock mechanism coupled between the actuator and the male member.

According to another aspect of the telescoping electronics mounting platform, the expandable locking mechanism of the interlocking mechanism further includes cooperating wedge members that are relatively slidable along a plane of mutual contact that is inclined relative to a longitudinal axis of the male member.

According to another aspect of the telescoping electronics mounting platform, the interlocking mechanism further includes a sleeve positioned between the reaction surface of the second frame member and the expandable locking mechanism, with the male member being slidable in the sleeve.

According to another aspect of the telescoping electronics mounting platform, the interlocking mechanism further includes a compression compensator positioned between the sleeve and either one of the reaction surface or the expandable locking mechanism.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 22 is a cross-section through the alternative locking platform having the second frame or body portion being in an expanded or open position relative to the first frame or body portion for receiving the accessory device thereinto, with the accessory device being removed for clarity;

FIG. 23 is a bottom perspective cross-section view of the alternative locking platform that better illustrates some aspects of the locking mechanism, including a pair of cooperating wedges;

FIG. 24 is a close-up view of the alternative locking platform that better illustrates some aspects of the locking mechanism, including the cooperating wedges;

FIG. 25 is a cross-section through the alternative locking platform having the second frame or body portion being in a closed or retracted position relative to the first body portion for retaining the accessory device therein, with the accessory device being removed for clarity;

FIG. 28 is a cross-section through the alternative locking platform that illustrates by example and without limitation a key lock mechanism being unlocked for disengaging the interlock mechanism between the actuator knob and a coupler so that turning of the actuator knob causes the actuator knob to spin freely independently of the unlocked coupler rod and without driving the same;

FIG. 29 is a cross-section through the alternative locking platform that illustrates by example and without limitation another embodiment of the drive mechanism, wherein the actuator knob of the telescoping interlocking mechanism is a cam device rotatably coupled to a near end of the coupler rod.

DETAILED DESCRIPTION OF PREFERRED EMBODIMENT

In the Figures, like numerals indicate like elements.

Figure 1:
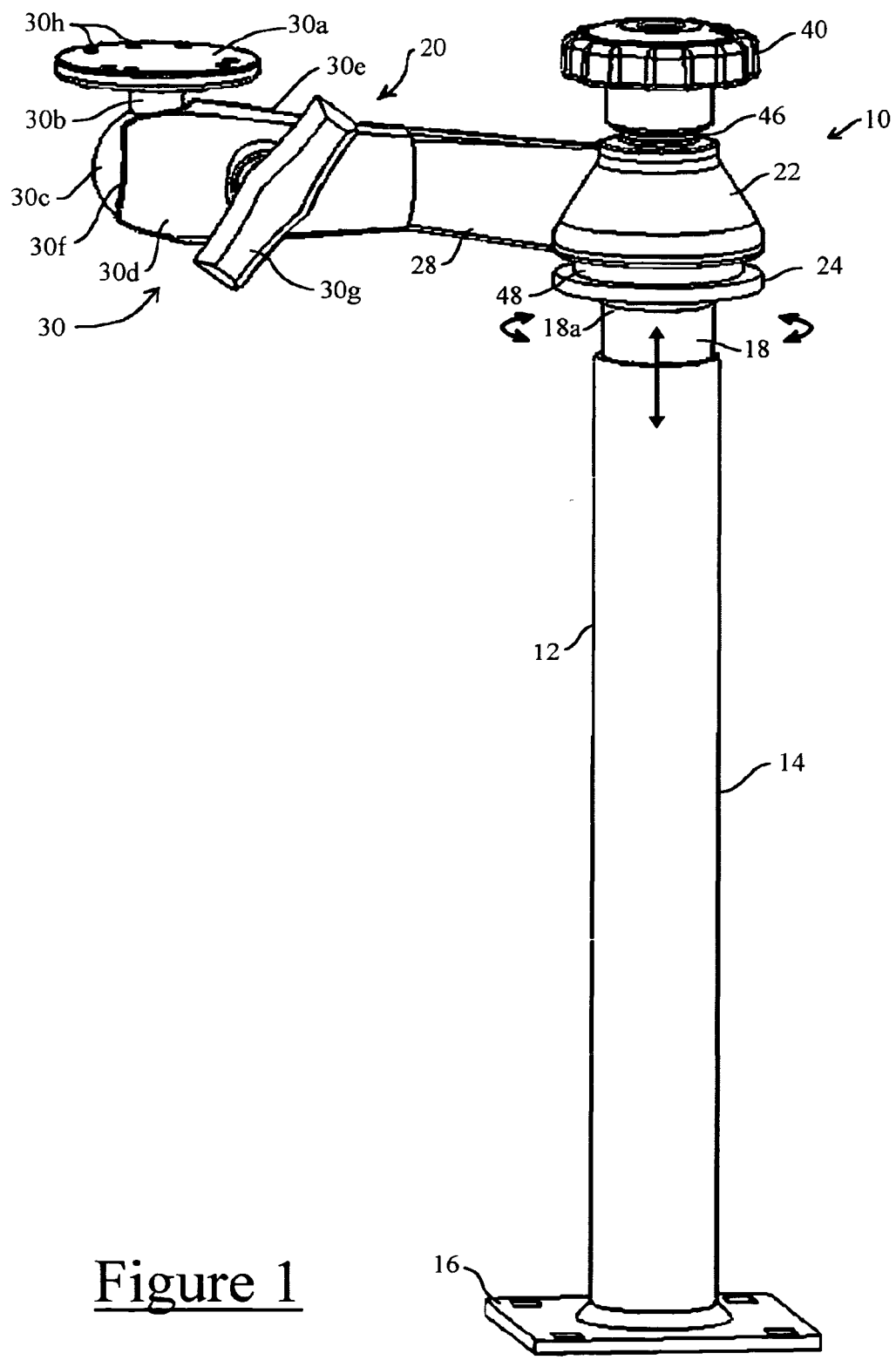
FIG. 1 is a perspective view that illustrates by example and without limitation the present invention embodied as a telescoping pole mount.

FIG. 1 illustrates the present invention by example and without limitation embodied as a telescoping pole mount 10 having at its core a telescoping pole 12 formed of an outer female tube 14 standing on a base plate 16, and an inner male tube 18 sized to slide lengthwise within the female tube 14, as indicated by the straight arrows, to different lengthwise relative positions. The relative positions of the female and male tubes 14, 18 of the telescoping pole 12 are arbitrary and are optionally reversed in a device that practices the present invention within the scope and intent of the present invention. A rotatable apparatus or mechanical arm 20 is mounted on the male tube 18 external to the female tube 14 and is rotatable about the telescoping pole 12, as indicated by the curved arrows, without unlocking the female and male tubes 14, 18.

According to embodiment, the rotatable mechanical arm 20 includes a hub 22 that rotates completely around the pole 12 on a substantially planar platform 24 that is optionally fixed stationary to one end 18a of the male tube 18 that remains external to the female tube 14. When stationary, the platform 24 is for example threaded, machined, molded, cast, welded or otherwise securely fixed to the external end 18a of the male tube 18. Alternatively, the platform 24 is free to rotate about the telescoping pole 12, as indicated by the curved arrows, without unlocking the female and male tubes 14, 18.

According to this embodiment of the invention, the rotatable arm 20 includes an arm 28 that extends away outward from the pole 12. By example and without limitation, the arm 28 culminates in a ball and socket mounting apparatus 30 of the type described in U.S. Pat. No. 5,845,885, which is incorporated by reference herein in its entirety. For example, the ball and socket mounting apparatus 30 provides a positionable mounting platform 30a extended on a post 30b from a sphere 30c of resiliently compressible material that is angularly and rotationally positionable between a pair of clamping arms 30d, 30e that together form a socket 30f that is clamped about the sphere 30c when a clamping mechanism 30g is engaged and tightened. The sphere 30c of resiliently compressible material is captured in the socket 30f by increased tightening of the clamping mechanism 30g to squeeze together the clamping arms 30d, 30e. The positionable mounting platform 30a (shown with a pattern of mounting holes 30h) is optionally structured to any device or structure of the user's choice.

Figure 2:
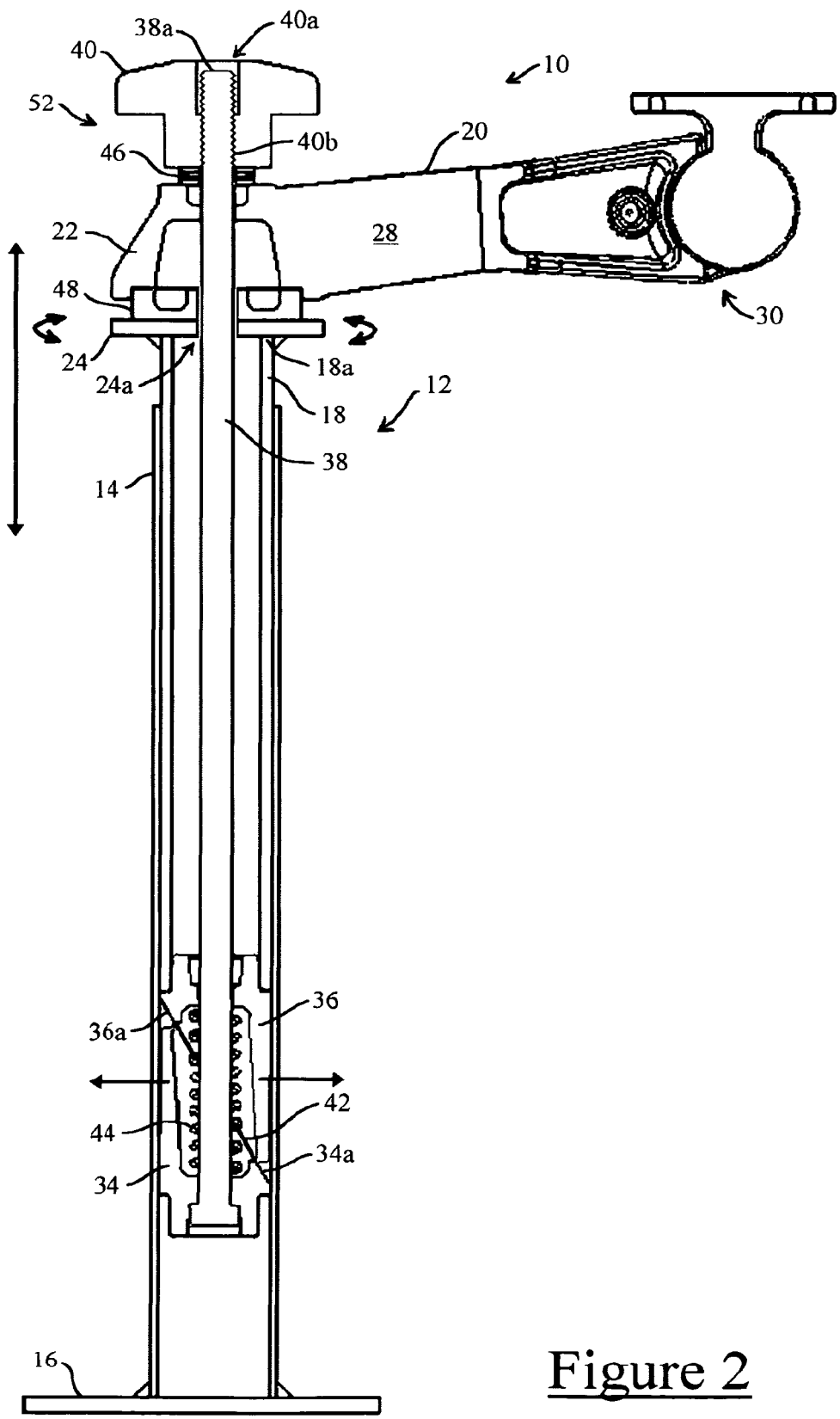
FIG. 2 is a cross sectional view that illustrates one embodiment of the telescoping pole mount of the invention.

FIG. 2 is a cross sectional view of the telescoping pole mount 10 of the invention that illustrates the telescoping pole 12 of the invention with the male tube 18 locked within the female tube 14 at a selected elevation by a lengthwise locking mechanism 32. According to one embodiment of the invention, the lengthwise locking mechanism 32 is formed by a pair of cooperating wedges 34, 36 that are forced apart laterally by sliding along a sharply inclined plane of mutual contact 42 that is formed between respective inclined surfaces 34a, 36a when their combined lengthwise dimension is forcefully compressed. According to one embodiment of the invention, the cooperating wedges 34, 36 are substantially identical in configuration so that a single wedge form or mold is used to produce both of the pair of cooperating wedges 34, 36. However, substantial identity between the cooperating wedges 34, 36 is not necessary and may be eliminated in a practical application of the invention, as discussed herein below.

A lengthwise drive mechanism 52 of the invention cooperates with the lengthwise locking mechanism 32 for driving the cooperating wedges 34, 36 together along the inclined plane of mutual contact 42. By example and without limitation, the lengthwise drive mechanism 52 of the invention is configured to pull the inclined surface 34a of the farther wedge 34 against the inclined surface 36a of the nearer wedge 36 along the inclined plane of mutual contact 42. According to one embodiment of the invention, the lengthwise drive mechanism 52 of the invention is configured having a coupler 38 that is coupled to the farther wedge 34 and extended past the nearer wedge 36 and through the male tube 18 and beyond the platform 24 at the male tube's external end 18a. An actuator 40 is coupled to the coupler 38 external of the male tube 18 for driving the coupler 38 relative to the platform 24. In other words, the actuator 40 is structured for drawing the farther wedge 34 against the nearer wedge 36 by pulling the coupler 38 along the male tube 18 toward the platform 24 at the male tube's external end 18a.

By example and without limitation, the coupler 38 is embodied as an elongated bolt or threaded rod 38 that is extended lengthwise through the two cooperating wedges 34, 36; the actuator 40 is embodied as a threaded knob actuator 40 that engages a first threaded end of the 38a of the coupler 38 external of the male tube 18 beyond the platform 24. Turning the knob actuator 40 against the external platform 24 pulls the end 38a of the coupler 38 through the male tube 18, which in turn causes the threaded rod coupler 38 to draw the farther wedge 34 lengthwise along the inside of the outer female tube 14. Other lengthwise drive mechanisms 52 are also contemplated for drawing the farther wedge 34 against the nearer wedge 36 and may be substituted without deviating from the scope and intent of the invention. For example, a cam and lever are optionally substituted for the threaded rod coupler 38 and knob actuator 40 of the lengthwise drive mechanism 52.

At least the threaded end 38a of the rod coupler 38 is extended external to the male tube 18 and platform 24 by, for example, passing though a clearance hole 24a through the platform 24 that is substantially aligned with the center of the male tube 18, and thus simultaneously substantially centers the rod coupler 38 relative to both of the surrounding tubes 14, 18. The knob actuator 40 is provided with a lengthwise bore 40a that is at least partially formed with an internal female thread 40b matched to male threads 38a formed on the rod coupler 38. Turning the knob actuator 40 pulls the rod coupler 38 through the male tube 18, which simultaneously draws the farther cooperating wedge 34 lengthwise of the female tube 14 and against the nearer cooperating wedge 36. The respective sharply inclined surfaces 34a, 36a of the cooperating wedges 34, 36 interact along a sharply inclined plane of mutual contact 42 which forces the cooperating wedges 34, 36 to move crosswise to one another and laterally of the male tube 18, as indicated by the outwardly pointing arrows. This relative crosswise motion drives the cooperating wedges 34, 36 to jam and wedge laterally against an inner wall 14a of the female tube 14. The cooperating wedges 34, 36 thus cause the locking mechanism 32 to fix the male tube 18 lengthwise of the female tube 14.

Reversing the knob actuator 40 lengthens the rod 38 within the male tube 18 and permits the farther wedge 34 to back away from the nearer wedge 36 along the plane of contact 42. With the lengthwise force of the rod coupler 38 removed, the wedges 34, 36 return to their normal positions central of the female tube 14. The lengthwise locking mechanism 32 is thereby released, which permits selective lengthwise adjustment of the male tube 18 relative to the female tube 14 before re-engaging the locking mechanism 32.

Figure 3:
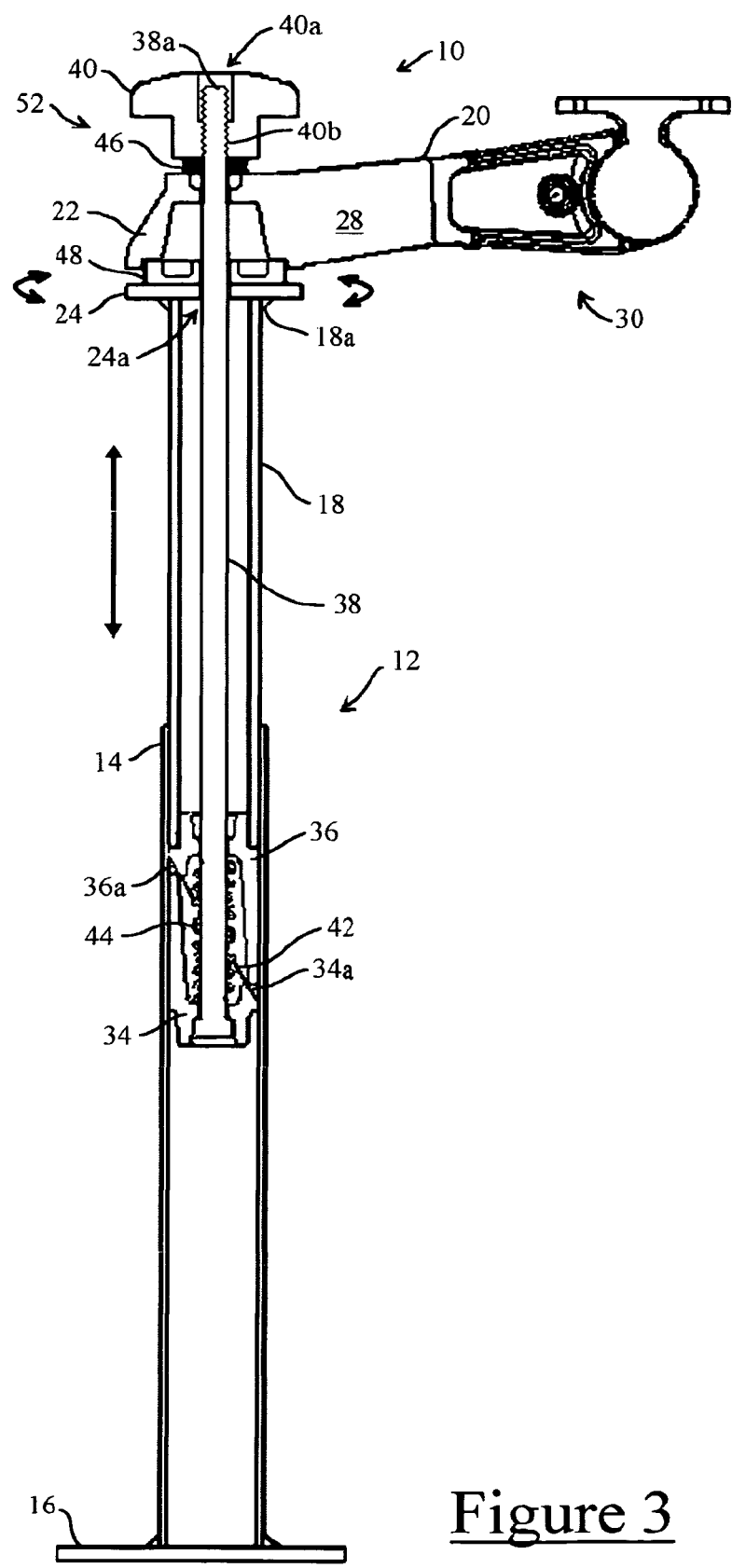
FIG. 3 is a cross sectional view of the telescoping pole mount of the invention that illustrates a male tube member being repositioned lengthwise of a female tube member.

FIG. 3 illustrates, by example and without limitation, the male tube 18 being repositioned lengthwise of the female tube 14.

Figure 4:
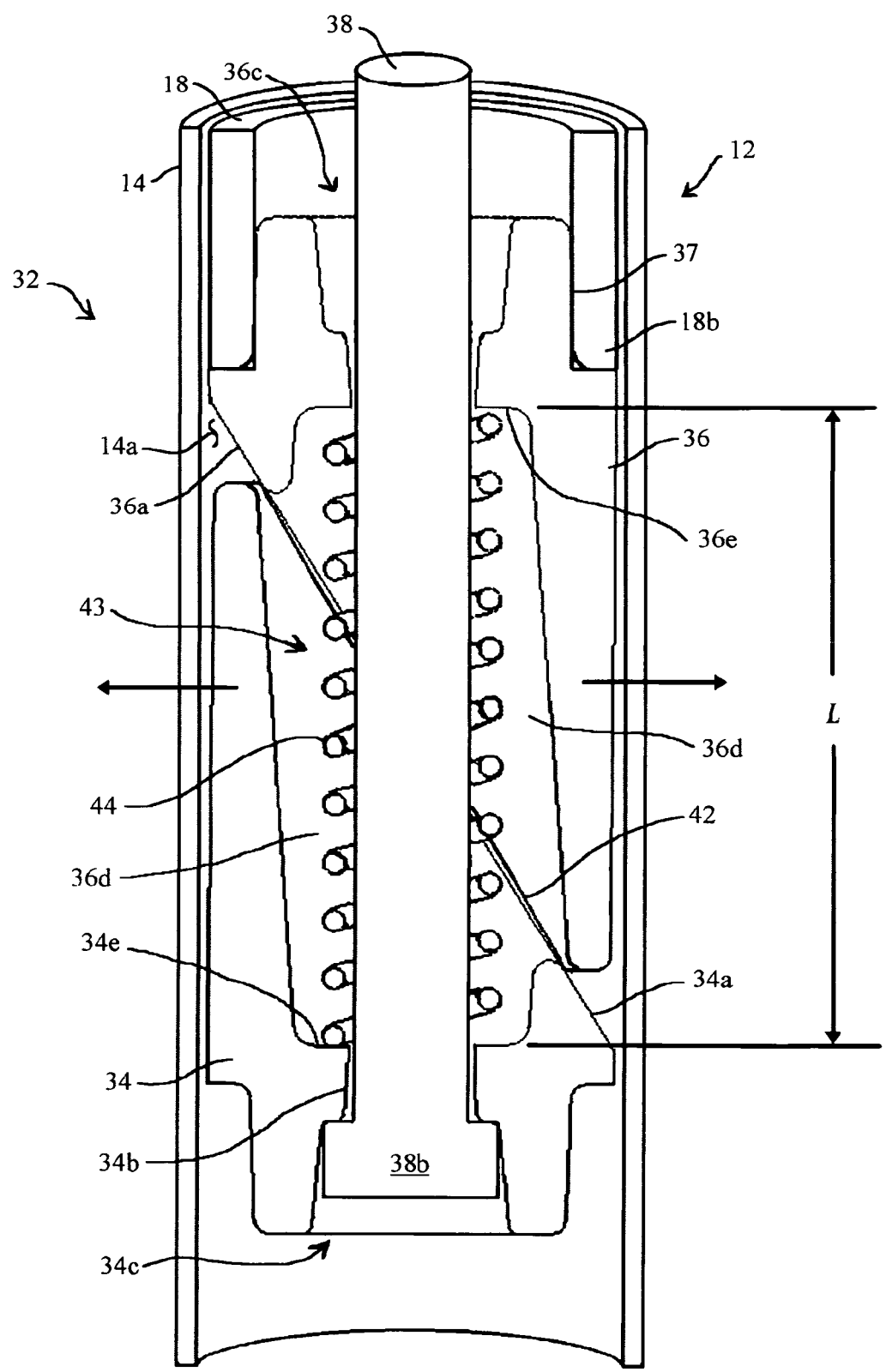
FIG. 4 is a close-up cross sectional view that illustrates one embodiment of a lengthwise locking mechanism of the invention.

FIG. 4 is a close-up view of the cooperating wedges 34, 36 of the lengthwise locking mechanism 32. A joint 37 is expected to be formed between the nearer wedge 36 and a second end 18b of the male tube 18 that remains within the female tube 14. Accordingly, the nearer wedge 36 is expected to be welded, threaded, swaged, keyed, pinned or otherwise coupled in a rotationally fixed relationship with the second end 18b of the male tube 18. By example and without limitation, the nearer wedge 36 is further formed with a lengthwise clearance passage 36b that is sized to slidingly pass the rod coupler 38 therethrough without appreciable interference and yet simultaneously substantially center the rod coupler 38 relative to both the wedge 36 and the surrounding tubes 14, 18. However, frictional forces may adequately substitute for expressly fixing the nearer wedge 36 relative to the male tube 18.

The farther wedge 34 and the rod coupler 38 are expected to be mutually structured to be rotationally fixed relative to one another. By example and without limitation, the wedge 34 is fixed to a second end 38b of the rod coupler 38 opposite from the first threaded end 38a. By example and without limitation, the farther wedge 34 is formed with a lengthwise clearance passage 34b that is sized to slidingly pass the rod coupler 38 therethrough, but is undersized relative to the oversized head 38b of the rod coupler 38. According to one embodiment of the invention, the farther wedge 34 and the oversized head 38b of the rod coupler 38 are structured in a mutually cooperative manner as to keep the rod coupler 38 from turning relative to the farther wedge 34. For example, the oversized rod head 38b is square or hex shaped and is sized to fit with a mating square or hex shaped socket 34c in the farther wedge 34 opposite from the incline surface 34a. According to one embodiment of the invention, the oversized head 38b is a nut, such as a locking nut, that is threaded onto the rod coupler 38 at the second end 38b opposite from the first end 38a. Alternatively, the wedge 34 is welded, threaded, swaged, keyed, pinned or otherwise coupled in a rotationally fixed relationship with the rod coupler 38, whereby the oversized head 38b may be eliminated. Any suitable structure for coupling the rod coupler 38 in a rotationally fixed relationship with the farther wedge 34 may be substituted without deviating from the scope and intent of the invention. Additionally, although the farther wedge 34 and the rod coupler 38 are expected to include such structure for being mutually rotationally fixed, frictional forces may adequately substitute for expressly fixing the farther wedge 34 relative to the rod coupler 38.

The nearer wedge 36 is optionally provided with a socket 36c opposite from the incline surface 36a to be consistent with the optional identity of the two wedges 34, 36. However, as discussed above, substantial identity between the cooperating wedges 34, 36 is not necessary. Therefore, the socket 36c may be eliminated in practice of the invention.

Turning the knob actuator 40 pulls the rod coupler 38 through the male tube 18 and draws the oversized head 38b of the rod coupler 38 toward the nearer wedge 36, which in turn draws the farther cooperating wedge 34 lengthwise along the inside of the outer female tube 14 and against the nearer cooperating wedge 36. Upon contact, the respective sharply inclined surfaces 34a, 36a of the cooperating wedges 34, 36 interact along an inclined plane of contact 42. The nearer wedge 36 cannot retreat relative to the male tube 18 that is strong enough to resist the stress in the rod coupler 38. Therefore, the continued action of the knob actuator 40 through the rod coupler 38 forcefully draws the farther wedge 34 to move along the plane of contact 42 crosswise to the nearer wedge 36 and laterally of the male tube 18, as indicated by the outward pointing arrows. According to one embodiment of the invention, the cooperating wedges 34, 36 are both sized to slide within the female tube 14 with little clearance. Therefore, crosswise and lateral motion drives the cooperating wedges 34, 36 to jam and wedge against an inner wall 14a of the female tube 14. The cooperating wedges 34, 36 thus cause the locking mechanism 32 to fix the male tube 18 lengthwise of the female tube 14.

Reverse turning of the knob actuator 40 reverses the rod coupler 38 into the male tube 18 and permits the farther wedge 34 to back away from the nearer wedge 36 along the plane of contact 42. With the lengthwise tension of the rod coupler 38 thus relieved, both wedges 34, 36 return to their normal positions central of the female tube 14. The lengthwise locking mechanism 32 is thus released, which permits selective adjustment of the male tube 18 relative to the female tube 14.

According to one embodiment of the invention, one or both the female and male tubes 14, 18 are round. Accordingly, they may be mutually rotatable so the apparatus or arm 20 can be rotated about the telescoping pole 12 even if it is fixed to the external end 18a of the male tube 18. Engaging the lengthwise locking mechanism 32 additionally secures the tubes 14, 18 against mutual rotation while simultaneously fixing the length or extension of the telescoping pole 12.

According to one embodiment of the invention, the female and male tubes 14, 18 are formed with cooperating shapes, such as mating square or hex shapes, so that they are substantially restricted against mutual rotation by their cooperating shapes. Accordingly, engaging the lengthwise locking mechanism 32 merely fixes the relative lengthwise positions of the tubes 14, 18 for fixing the length or extension of the telescoping pole 12.

Re-engaging the locking mechanism 32 fixes the male tube 18 in a new position relative to the female tube 14, as illustrated by example and without limitation in FIG. 3.

Also illustrated here is one exemplary embodiment of the invention for overcoming the disengagement resistance of prior art wedge mechanisms. In prior art devices, a sharp rap or other activation must be applied to disengage prior art wedge mechanisms from their interlocked relationship because they became so effectively jammed against one another and the wall of the tubes.

According to one embodiment of the invention, a disengaging mechanism 43 is provided for disengaging the wedges 34, 36 from their interlocked relationship. As illustrated here, the disengaging mechanism 43 is embodied as a strong compression spring 44 for disengaging the wedges 34, 36, for example by pushing the farther wedge 34 away from the nearer wedge 36. For example, the compression spring 44 is positioned between the cooperating wedges 34, 36. By example and without limitation, the wedges 34, 36 are formed with respective lengthwise hollow cavities 34d, 36d that communicate with one another along the plane of contact 42. The compression spring 44 is compressed to fit into the communicating cavities 34d, 36d. The spring 44 is sized having an uncompressed length that is longer than a combined length of the communicating lengthwise cavities 34d, 36d in the respective wedges 34, 36. When the farther wedge 34 is drawn against the nearer wedge 36, the compression spring 44 is compressed within the lengthwise cavities 34d, 36d between their opposing respective floor portions 34e, 36e. However, when effectively compressed, the compressed length of the spring 44 does not interfere with engagement of the inclined wedge surfaces 34a, 36a along the plane of contact 42 and consequent lateral spreading of the wedges 34, 36 during engagement of the locking mechanism 32.

Upon relief of the lengthwise tension of the rod coupler 38, expansion spring force in the compressed spring 44 operates against the opposing floor portions 34e, 36e of the wedge lengthwise cavities 34d, 36d. The expansion spring force operates to push apart and disengage the two interacting wedges 34, 36 to release the lengthwise locking mechanism 32. The expansion force in the spring 44 is sufficiently strong that, when the tension in the lengthwise rod coupler 38 is relieved, decompression and expansion of the spring 44 overcomes the jamming force that holds the wedges 34, 36 against the inner wall 14a of the female tube 14. Disengagement from the tube inner wall 14a permits the wedges 34, 36 to return to their normal positions central of the female tube 14 where they slide freely. The lengthwise locking mechanism 32 is released, and the male tube 18 is free to be repositioned relative to the female tube 14.

Figure 5:
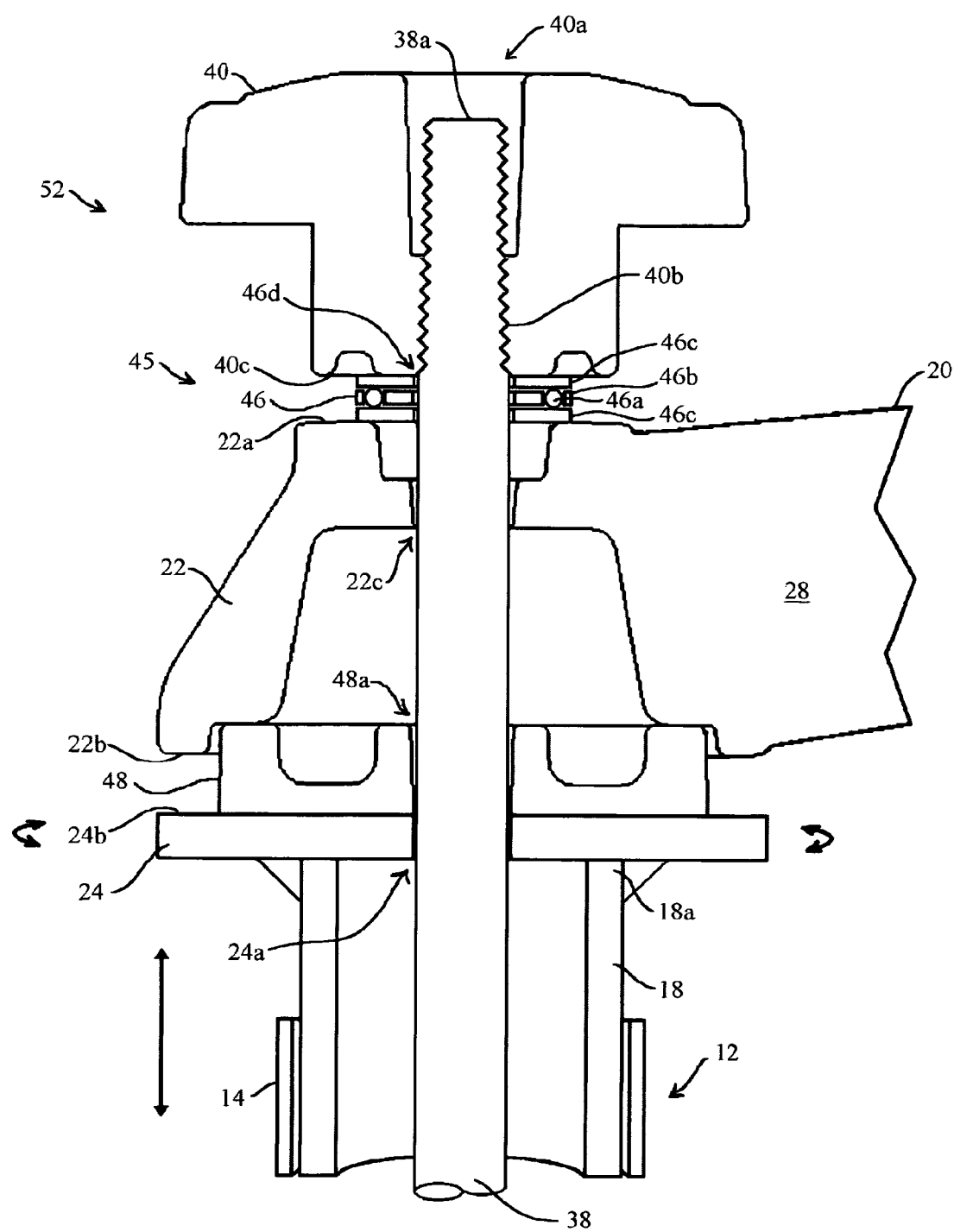
FIG. 5 is a close-up cross sectional view that illustrates one embodiment of a lengthwise drive mechanism of the invention for activating the lengthwise locking mechanism of the invention.

FIG. 5 illustrates one embodiment of a lengthwise drive mechanism 52 of the invention for drawing the rod coupler 38 through the male tube 18 and pulling the farther wedge 34 against the nearer wedge 36 along the inclined plane of contact 42. By example and without limitation, lengthwise drive mechanism 52 of the invention is provided as the knob actuator 40. According to one embodiment of the invention by example and without limitation, the knob actuator 40 is provided with a lengthwise bore 40a having an internal female thread 40b that is attached to male threads formed on the threaded end 38a of the rod coupler 38 opposite from the oversized head 38b. Alternatively, the rod coupler 38 is optionally so threaded for substantially its entire length. Turning the knob actuator 40 causes a contact surface 40c of the knob actuator 40 to act against the external platform 24 to draw the threaded rod coupler 38 through the platform 24 and pulls it through the male tube 18, as discussed herein. According to different embodiments of the invention, the knob actuator 40 alternatively works either directly against a contact surface 24b of the platform 24 (shown in subsequent Figures), or through the intervening hub 22 of the rotatable arm 20 (shown here).

The hub 22 of the rotatable arm 20 is structured to rotate about the telescoping pole 12 even while the lengthwise locking mechanism 32 is fully engaged for fixing the female and male tubes 14, 18 relative to one another. The inventor of the present invention has determined through experimentation that, without an interface structure between the threaded knob actuator 40 and the platform 24 for decoupling rotations of the rotatable arm 20 from the knob contact surface 40c, the threaded knob actuator 40 invariably loosens on the threaded rod end 38a when the arm 20 is rotated in the thread direction. Loosening of the knob actuator 40 relieves the tension in the rod coupler 38 and releases the lengthwise locking mechanism 32. The inner male tube 18 is then able to move freely within the outer female tube 14. Such loosening of the threaded knob actuator 40 and consequent release of the lengthwise locking mechanism 32 defeats the purpose of structuring the mechanical arm 20 to rotate about the telescoping pole 12.

By example and without limitation, one exemplary embodiment a decoupling mechanism 45 of the invention is illustrated for decoupling rotation of the rotatable mechanical arm 20 from the actuator knob's contact surface 40c and thereby overcoming the loosening of the lengthwise locking mechanism 32. A thrust bearing 46 is installed to interface between the contact surface 40c of the threaded knob actuator 40 and the contact surface 24b of the platform 24. When the rotatable mechanical arm 20 is installed between the threaded knob actuator 40 and platform 24, as shown, the thrust bearing 46 is interfaced between the actuator knob's contact surface 40c and a first contact surface 22a of the presentation platform's hub 22. The thrust bearing 46 decouples the rotational drive of the hub's contact surface 22a from the actuator knob's contact surface 40c. The thrust bearing 46 thus permits the hub 22 to rotate in either direction about the telescoping pole 12 without affecting the firmly threaded relationship between the rod end 38a and the threaded knob actuator 40. The thrust bearing 46 is, by example and without limitation, any form of conventional thrust bearing, including a pin thrust bearing, a roller thrust bearing, and a ball thrust bearing. For example, the thrust bearing 46 is structured of a quantity of hardened pins, rollers or balls 46a evenly distributed within a cage 46b between a pair of smooth plates or washers 46c. The washers 46c interface with the different contact surfaces 22a, 40c of the hub 22 and knob actuator 40, respectively. The hardened pins, rollers or balls 46a interface between the opposing washers 46c. According to one embodiment of the invention, the thrust bearing 46 includes a clearance passage 46d central of the cage 46b and washers 46c that admits passage of the threaded rod coupler 38 therethrough and that simultaneously serves to center the thrust bearing 46 within its space between the hub 22 and the threaded knob actuator 40 and to retain it in position during operation.

The thrust washer 46 has been determined to support any load that can be generated between the respective hub and knob interface surfaces 22a and 40c. Intervention of the thrust washer 46 has been determined to effectively decouple rotations of the rotatable mechanical arm 20 from the knob contact surface 40c such that the threaded knob actuator 40 invariably retains its threaded relationship with the threaded rod end 38a when the mechanical arm 20 is rotated in any direction, including the thread direction. The novel thrust bearing 46 interfaced between the actuator knob's contact surface 40c and the hub's contact surface 22a thus permits relative rotation of the mechanical arm 20, while the integrity of the threaded relationship between the rod end 38a and knob actuator 40 is maintained and effectiveness of the locking mechanism 32 remains uncompromised.

An optional bushing 48 may be interfaced between a second opposite contact surface 22b of the hub 22 portion of the rotatable mechanical arm 20 and the stationary platform's contact surface 24b for easing rotation of the mechanical arm 20 relative to the platform 24. For example, the bushing 48 is formed in a thick washer shape having a central passage 48a for clearance of the rod coupler 38. The bushing 48 is formed of a conventional material, such as nylon, Teflon®, or Delrin®, or another bushing material. Alternatively, another thrust bearing 46 is substituted for the bushing 48 between the hub's second contact surface 22b and the platform's contact surface 24b.

Alternatively, a bushing formed of a non-conventional bushing material is substituted for the bushing 48. Such non-conventional bushing material is a low durometer "spongy" material, whereby the bushing 48 is substantially resiliently compressible. Furthermore, the non-conventional low durometer bushing material also has a "sticky" surface with a high coefficient of friction. Accordingly, the low durometer material causes bushing 48 to resiliently compress between the hub 22 and the platform's contact surface 24b, while the high coefficient of friction surface causes bushing 48 to stick therebetween so that the mechanical arm 20 is frictionally constrained from rotation relative to the platform 24.

Also illustrated is a clearance passage 22c through the hub 22 that is sized to pass the threaded rod coupler 38 and thereby retain alignment of the rotatable mechanical arm 20 relative to the telescoping pole 12 during rotation thereabout.

Figure 6:
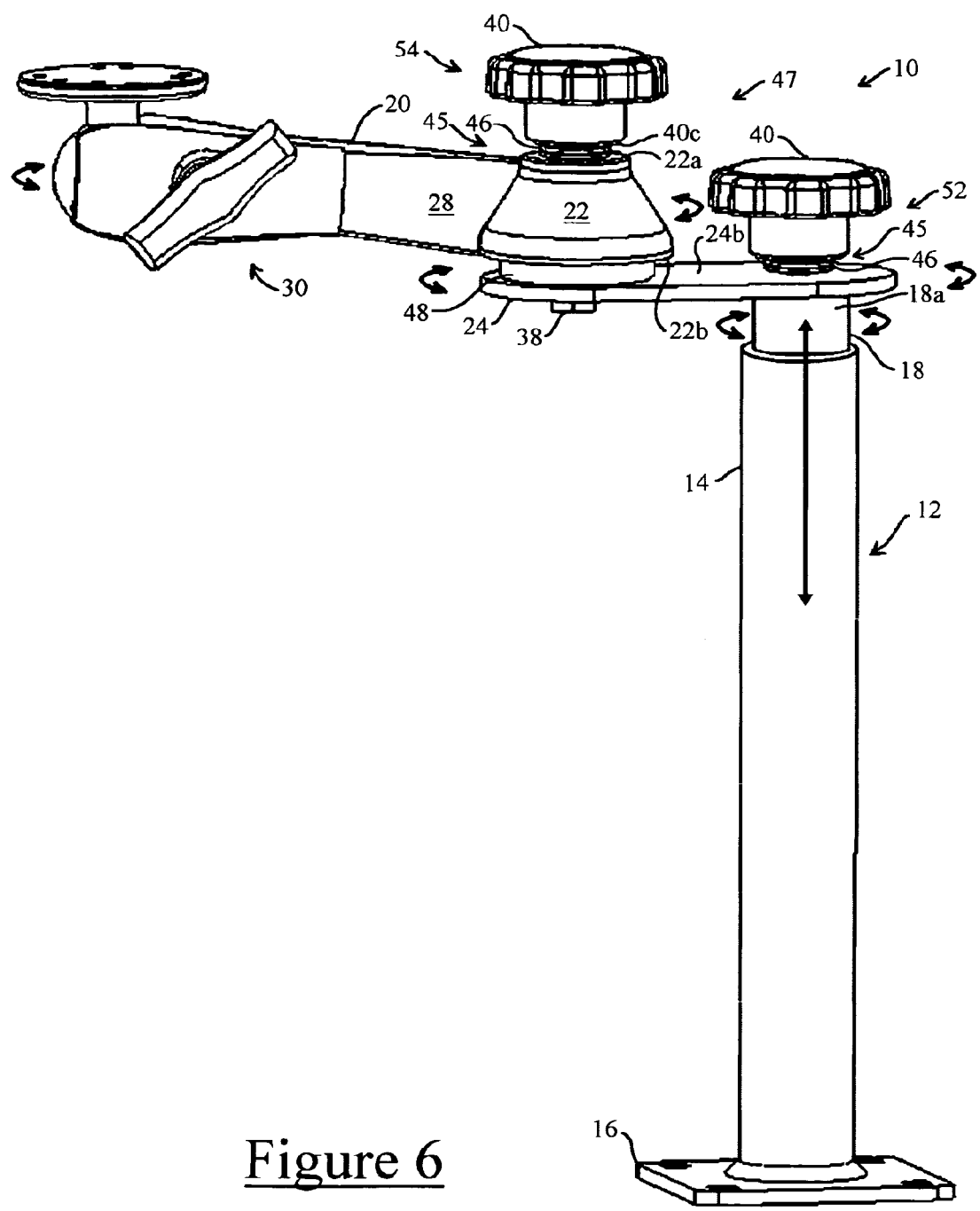
FIG. 6 is a perspective view that illustrates by example and without limitation one alternative embodiment of the telescoping pole of the present invention having a double arm mechanism.

FIG. 6 illustrates the telescoping pole 12 of the present invention alternatively embodied as having a first one of the threaded knob actuators 40 alternatively positioned to work against the platform 24, without intervention of the rotatable mechanical arm 20, for operating the lengthwise locking mechanism 32 and thereby fixing the elevation of the telescoping pole 12. Here the male tube 18 and the optionally stationary platform 24 fixed on its exterior end 18a together can be rotated relative to the telescoping pole 12 while the locking mechanism 32 is relaxed, when one or both of the tubes 14, 18 are round. However, when the locking mechanism 32 is engaged, the optionally stationary platform 24 is fixed to the male tube 18 so that it is not rotatable relative to the telescoping pole 12, as contrasted with the rotation of the mechanical arm 20 relative to the platform 24. Therefore, only a common flat washer 50 is provided for interfacing between the first knob actuator's contact surface 40c and the platform's contact surface 24b for easing turning of the knob actuator 40. According to one embodiment of the invention, the decoupling mechanism 45 of the invention is optionally interfaced between the first actuator knob's contact surface 40c and the stationary platform's contact surface 24b for further easing turning of the knob actuator 40. For example, either the thrust bearing 46 or bushing 48 is optionally interfaced between the first actuator knob's contact surface 40c and the stationary platform's contact surface 24b. However, the thrust bearing 46 and bushing 48 interfaces are unnecessary because the platform 24 is fixed to the male tube 18 so that it is not rotatable relative to the telescoping pole 12 as contrasted with the rotation of the rotatable mechanical arm 20 relative to the platform 24. Therefore, no opportunity is presented for loosening the knob actuator 40 on the threaded rod end 38a through rotation of the intervening platform 24.

As illustrated here, the platform 24 is enlarged relative to embodiments illustrated in previous figures, and the rotatable mechanical arm 20 is positioned remotely from the telescoping pole 12. When the telescoping pole 12 has been extended to a selected elevation and fixed by operation of the lengthwise locking mechanism 32, as detailed in subsequent figures, the mechanical arm 20 is rotatable relative to the enlarged platform 24 at its remote position from the telescoping pole 12. A lengthwise clamping mechanism 54 fixes the rotatable hub 22 firmly against the platform 24 so that the rotatable mechanical arm 20 neither tips nor wobbles when loaded, yet the mechanical arm 20 is fully rotatable relative to the platform 24. According to one embodiment of the invention, the lengthwise clamping mechanism 54 includes a second decoupling mechanism 45 of the invention for decoupling rotation of the rotatable mechanical arm 20 and thereby overcoming the loosening of the lengthwise clamping mechanism 54.

Optionally, another bushing 48 may be interfaced between the second opposite contact surface 22b of the hub 22 of the rotatable mechanical arm 20 and the stationary platform's contact surface 24b for easing rotation of the mechanical arm 20 relative to the platform 24.

According to one embodiment of the invention, the platform 24 is rotatable relative to the end 18a of the male tube 18. Therefore, the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. According to this embodiment of the invention, the external end 18a of the male tube 18 is substantially planar such that the platform 24 slides on the tube end 18a for being rotated about the telescoping pole 12. The rotatability of the platform 24 causes the rotatable apparatus or mechanical arm to be formed of two parts: an inner arm 24 and the outer arm 20, together a double arm mechanism 47. In other words, the double arm mechanism 47 is formed by inner arm platform 24 and outer arm 20 that operate as respective upper arm and forearm of the human anatomy and are interconnected by an elbow joint that is represented by the hub 22 of the outer arm 20 that is rotatable relative to the enlarged platform 24 at its remote position from the telescoping pole 12. The shoulder joint is represented by the enlarged platform 24 that is rotatable relative to the male tube 18 at the end of the telescoping pole 12. A hand portion of the two-part mechanical arm is represented by, for example, the ball and socket mounting apparatus 30 of the type described in U.S. Pat. No. 5,845,885.

Figure 7:
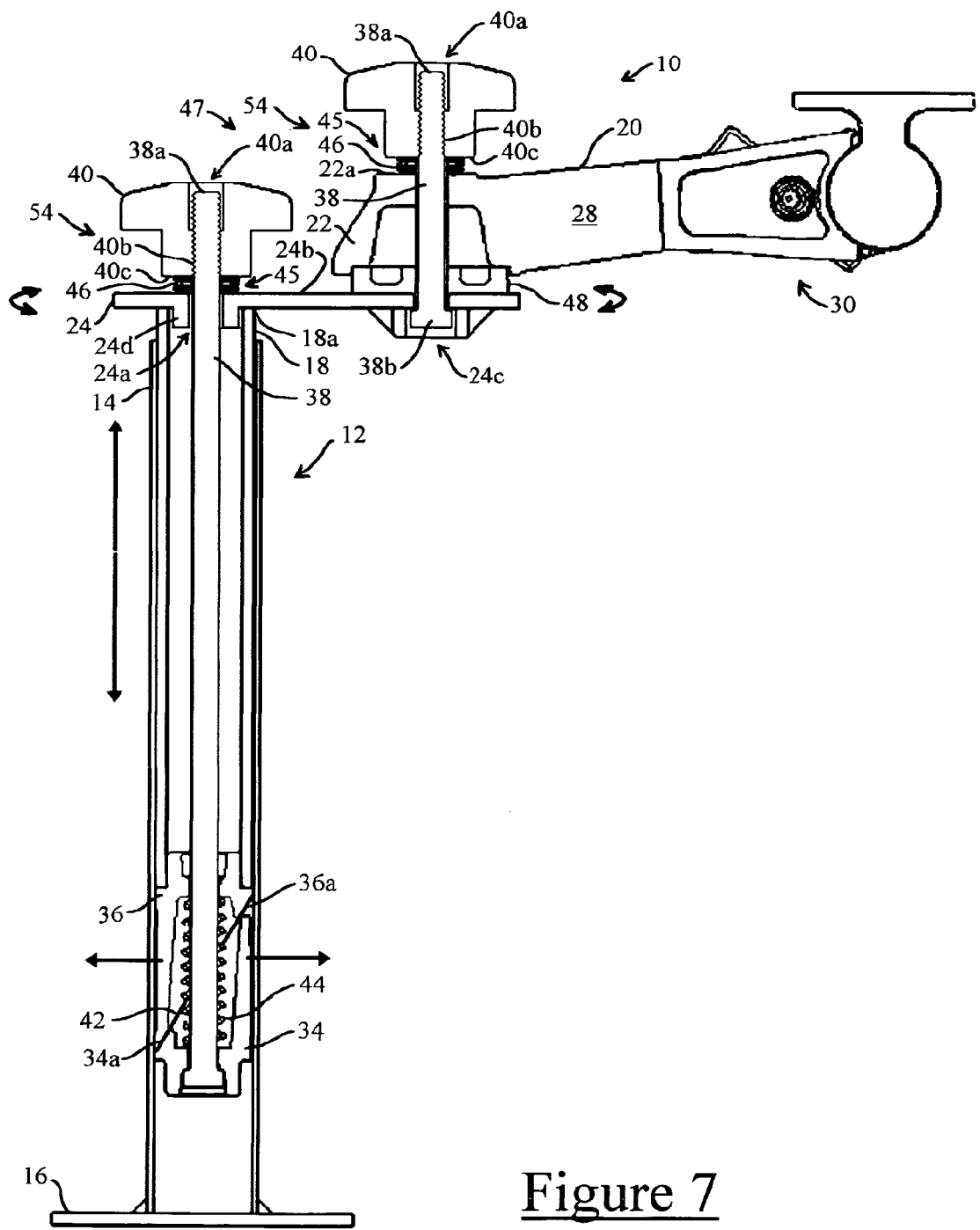
FIG. 7 is a cross sectional view that illustrates an alternative embodiment of the lengthwise locking mechanism of the invention.

FIG. 7 illustrates an alternative embodiment of the lengthwise locking mechanism 32 having the knob actuator 40 operating against the enlarged stationary or optionally rotatable platform 24. Optionally, the thrust bearing 46 (shown) or the bushing 48 may be interfaced between the first actuator knob's contact surface 40c and the stationary platform's contact surface 24b for easing turning of the first knob actuator 40 for engaging the cooperating wedges 34, 36 of the lengthwise locking mechanism 32. The lengthwise locking mechanism 32 operates as discussed herein.

Also illustrated is the lengthwise clamping mechanism 54 for fixing the rotatable hub 22 firmly against the platform 24 so that the rotatable mechanical arm 20 neither tips nor wobbles when loaded, yet permits the mechanical arm 20 to rotate fully relative to the platform 24.

According to one embodiment of the invention, the lengthwise clamping mechanism 54 that fixes the rotatable hub 22 firmly against the platform 24, and simultaneously permits the mechanical arm 20 to rotate fully relative to the platform 24 is embodied as a second coupler 38 in cooperation a second actuator 40. A second decoupling mechanism 45 of the invention is interfaced between the second actuator knob 40 and the rotatable arm 20 for decoupling rotation of the rotatable mechanical arm 20 from the second actuator knob's contact surface 40c and thereby overcoming the loosening of the lengthwise clamping mechanism 54. For example, a second thrust bearing 46 is interfaced between the second actuator 40 and the hub 22 of the rotatable arm 20. The second coupler 38 is extended beyond the enlarged platform 24 remotely from the telescoping pole 12.

The mechanical arm 20 is rotatable relative to the enlarged platform 24 by the second coupler 38 passing through the hub 22. The second actuator 40 is, for example, a second knob that is threaded onto a threaded end 38a of the second coupler 38 for securing the hub 22 in such manner as to permit the mechanical arm 20 to rotate about the second coupler 38 relative to the enlarged platform 24. According to one embodiment of the invention, the second decoupling mechanism 45 of the invention is embodied as the second thrust bearing 46 that is interfaced between the second knob actuator's contact surface 40c and the first contact surface 22a of the hub 22. The second thrust bearing 46 effectively decouples the rotational drive of the hub's contact surface 22a from the second knob actuator's contact surface 40c, which permits the hub 22 to rotate in either direction about the second coupler 38 without affecting the threaded relationship between the threaded end 38a of the second coupler 38 and the second knob actuator 40, i.e., without loosening the second knob actuator 40 on the second coupler 38 when the hub 22 is rotated in the thread direction.

According to one embodiment of the invention, the platform 24 and the remote rotatable mechanical arm 20 together form respective inner and outer portions of the double arm mechanism 47. The platform 24 is thus rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the end 18a of the male tube 18, it is optionally formed with a spud 24d for alignment with the male tube 18. The clearance hole 24a is sufficient to maintain the coupler 38 in substantial alignment with the platform 24 and the male tube 18 of the telescoping pole 12.

Figure 8:
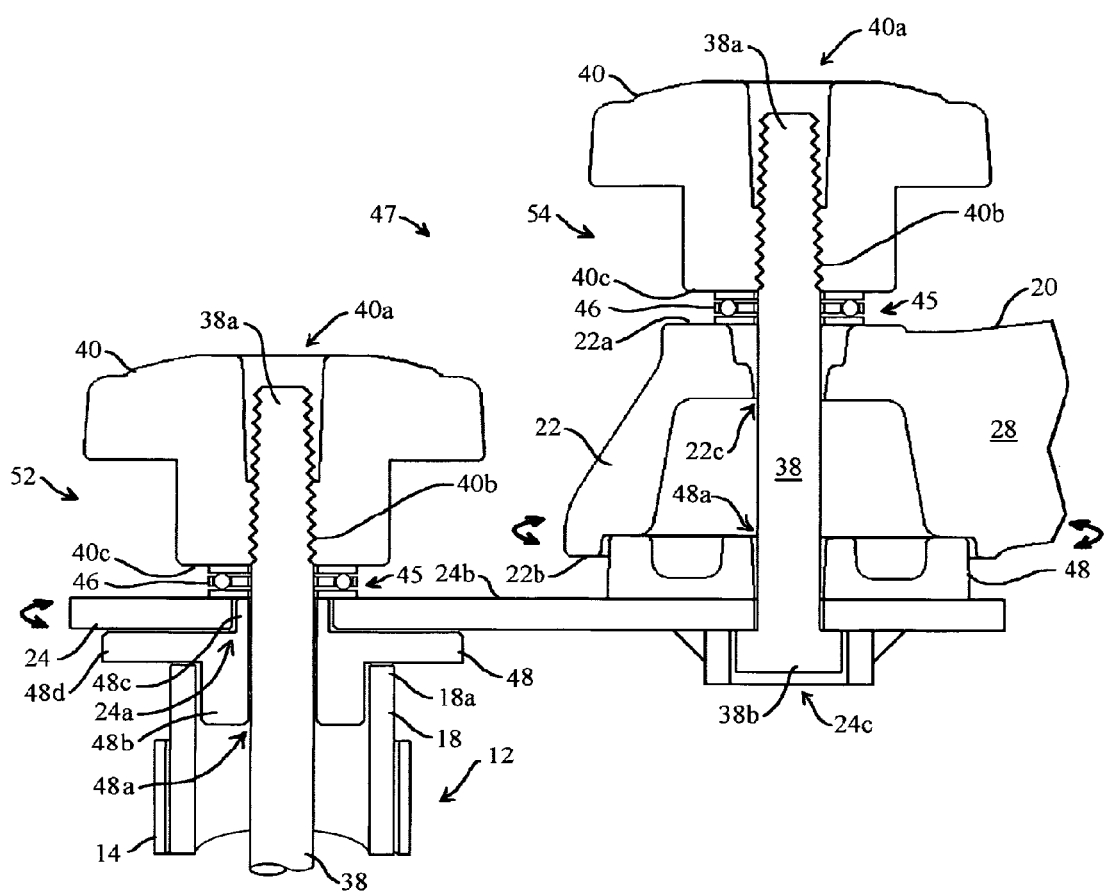
FIG. 8 is a close-up cross sectional view that illustrates one embodiment of the lengthwise drive mechanism of the invention of the invention.

FIG. 8 illustrates one embodiment of the lengthwise drive mechanism 52 of the invention of the invention for drawing the length of the rod coupler 38 through the male tube 18 for pulling the farther wedge 34 against the nearer wedge 36 along the inclined plane of mutual contact 42. By example and without limitation, turning the threaded knob actuator 40 causes the knob actuator's contact surface 40c to act against the contact surface 24b of the external platform 24 for drawing the rod coupler 38 through the platform 24 and progressively drawing it through the male tube 18, as discussed herein. According to different embodiments of the invention, the knob actuator 40 alternatively works either directly against a contact surface 24b of the platform 24 (shown here), or through the intervening hub 22 of the mechanical arm 20 (shown in previous Figures). Optionally, the decoupling mechanism 45 of the invention is included as part of the lengthwise drive mechanism 52 for easing rotation of the threaded knob actuator 40 relative to the contact surface 24b of the platform 24. For example, the thrust washer 46 optionally interfaces between the knob actuator's contact surface 40c and the stationary platform's contact surface 24b. Optionally, the bushing 48 may be interfaced between the knob actuator's contact surface 40c and the stationary platform's contact surface 24b for easing rotation of the threaded knob actuator 40 relative to the platform's contact surface 24b.

The platform 24 is optionally stationary relative to the end 18a of the male tube 18.

According to one embodiment of the invention, the platform 24 and the remote rotatable mechanical arm 20 together form respective inner and outer portions of the double arm mechanism 47. Accordingly, the platform 24 is rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the male tube 18, the bushing 48 is optionally interfaced between the platform 24 the male tube end 18a. The bushing 48 is optionally formed with a spud 48b for alignment with the male tube 18, while the clearance hole 48a is sufficient to maintain the coupler 38 in substantial alignment with the platform 24 and the male tube 18 of the telescoping pole 12. A sleeve portion 48c of the bushing within the clearance hole 24a decouples rotations of the platform 24 from the coupler 38, while a flange portion 48d decouples the rotations of the platform 24 from the end 18a of the male tube 18.

Also illustrated here is the lengthwise clamping mechanism 54 for fixing the rotatable hub 22 firmly against the platform 24 at a remote location from the telescoping pole 12 so that the rotatable mechanical arm 20 neither tips nor wobbles when loaded, yet the mechanical arm 20 is fully rotatable relative to the platform 24.

According to one embodiment of the invention, the lengthwise clamping mechanism 54 includes the second bolt or threaded rod coupler 38 in cooperation the second threaded knob actuator 40. The second decoupling mechanism 45 of the invention is interfaced between the second knob actuator 40 and the hub 22 of the rotatable arm 20. By example and without limitation, the second decoupling mechanism 45 of the invention is provided as the second thrust bearing 46 that is interfaced between the second knob actuator 40 and the hub 22 of the rotatable arm 20. The threaded end 38a of the second coupler 38 is extended beyond the contact surface 24b of the enlarged platform 24 at a position located remotely, i.e., spaced away, from the telescoping pole 12.

According to one embodiment of the invention, the oversized head 38b of the second coupler 38 and a remote portion of the enlarged platform 24 are structured in a mutually cooperative manner as to keep the second coupler 38 from turning relative to the platform 24. For example, the second coupler 38 is a conventional bolt having an enlarged square or hex shaped head 38b that is sized to fit with a mating square or hex shaped socket 24c in the platform 24 opposite from the contact surface 24b. According to one embodiment of the invention, the second coupler 38 is a rod threaded substantially its entire length and the oversized head 38b is a nut, such as a locking nut, that is threaded onto the second coupler 38 at the second end 38b opposite from the first threaded end 38a. Alternatively, the enlarged platform 24 is welded, threaded, swaged, keyed, pinned or otherwise coupled in a rotationally fixed relationship with the second coupler 38, whereby the oversized head 38b may be eliminated. Any suitable structure for coupling the second coupler 38 in a rotationally fixed relationship with the enlarged platform 24 may be substituted without deviating from the scope and intent of the invention. Additionally, although the enlarged platform 24 and the second coupler 38 are expected to include such structure for being mutually rotationally fixed, frictional forces may adequately substitute for expressly fixing the second coupler 38 relative to the enlarged platform 24.

The hub 22 of the rotatable mechanical arm 20 is structured to rotate relative to the enlarged platform 24 even while the lengthwise clamping mechanism 54 is fully engaged for clamping the rotatable arm 20 firmly to the platform 24. According to one embodiment of the invention, the hub 22 of the mechanical arm 20 is formed with the clearance passage 22c that is sized to pass the second bolt or rod coupler 38. The second knob actuator 40 is firmly threaded to the threaded end 38b of the second coupler 38 and thereby retains the rotatable mechanical arm 20 in firm contact with the contact surface 24b of the enlarged platform 24 even during rotation thereabout.

The inventor of the present invention has determined through experimentation that, without an interface structure between the second threaded knob actuator 40 and the platform 24 for decoupling rotations of the mechanical arm 20 from the second actuator knob's contact surface 40c, the second threaded knob actuator 40 invariably loosens on the threaded coupler end 38a when the arm 20 is rotated in the thread direction. Loosening of the second threaded knob actuator 40 relieves the tension in the second coupler 38 and releases the lengthwise clamping mechanism 54. The rotatable mechanical arm 20 is then able to tip and wobble freely relative to the platform 24. Such loosening of the second threaded knob actuator 40 and consequent release of the lengthwise clamping mechanism 54 defeats the purpose of structuring the mechanical arm 20 to rotate about the second coupler 38.

By example and without limitation, the second decoupling mechanism 45 of the invention is provided for decoupling rotation of the rotatable mechanical arm 20 from the second actuator knob's contact surface 40c and thereby overcoming the loosening of the lengthwise clamping mechanism 54. The second decoupling mechanism 45 of the invention is provided as the second thrust bearing 46 which is installed to interface between the contact surface 40c of the second knob actuator 40 and the first contact surface 22a of the rotatable presentation platform's hub 22. The second thrust bearing 46 decouples the rotational drive of the hub's contact surface 22a from the second actuator knob's contact surface 40c. The thrust bearing 46 thus permits the hub 22 to rotate in either direction about the second coupler 38 without affecting the firmly threaded relationship between the second coupler's threaded end 38a and the second threaded knob actuator 40. The thrust bearing 46 is, by example and without limitation, any form of conventional thrust bearing, including a pin thrust bearing, a roller thrust bearing, and a ball thrust bearing, as discussed herein, with the central clearance passage 46d fit over the second coupler 38, which simultaneously serves to center the second thrust bearing 46 within its space between the hub 22 and the second threaded knob actuator 40 and to retain it in position during operation.

The thrust bearing 46 has been determined to support any practical load that can be generated between the respective hub and second knob interface surfaces 22a and 40c. Intervention of the second thrust bearing 46 has been determined to effectively decouple rotations of the rotatable mechanical arm 20 from the second knob contact surface 40c such that the second threaded knob actuator 40 invariably retains its threaded relationship with the threaded end 38a of the second coupler 38 when the mechanical arm 20 is rotated in any direction, including the thread direction. The novel interfacing of the second thrust bearing 46 between the second actuator knob's contact surface 40c and the hub's contact surface 22a thus permits relative rotation of the mechanical arm 20, while the integrity of the threaded relationship between the threaded end 38a of the second coupler 38 and the second threaded knob actuator 40 is maintained and effectiveness of the clamping mechanism 54 remains uncompromised.

Optionally, the bushing 48 may be interfaced between the second contact surface 22b of the hub 22 portion of the rotatable mechanical arm 20 and the stationary platform's contact surface 24b for easing rotation of the mechanical arm 20 relative to the platform 24. Alternatively, another thrust bearing 46 is substituted for the bushing 48 between the hub's second contact surface 22b and the platform's contact surface 24b.

Figure 9:
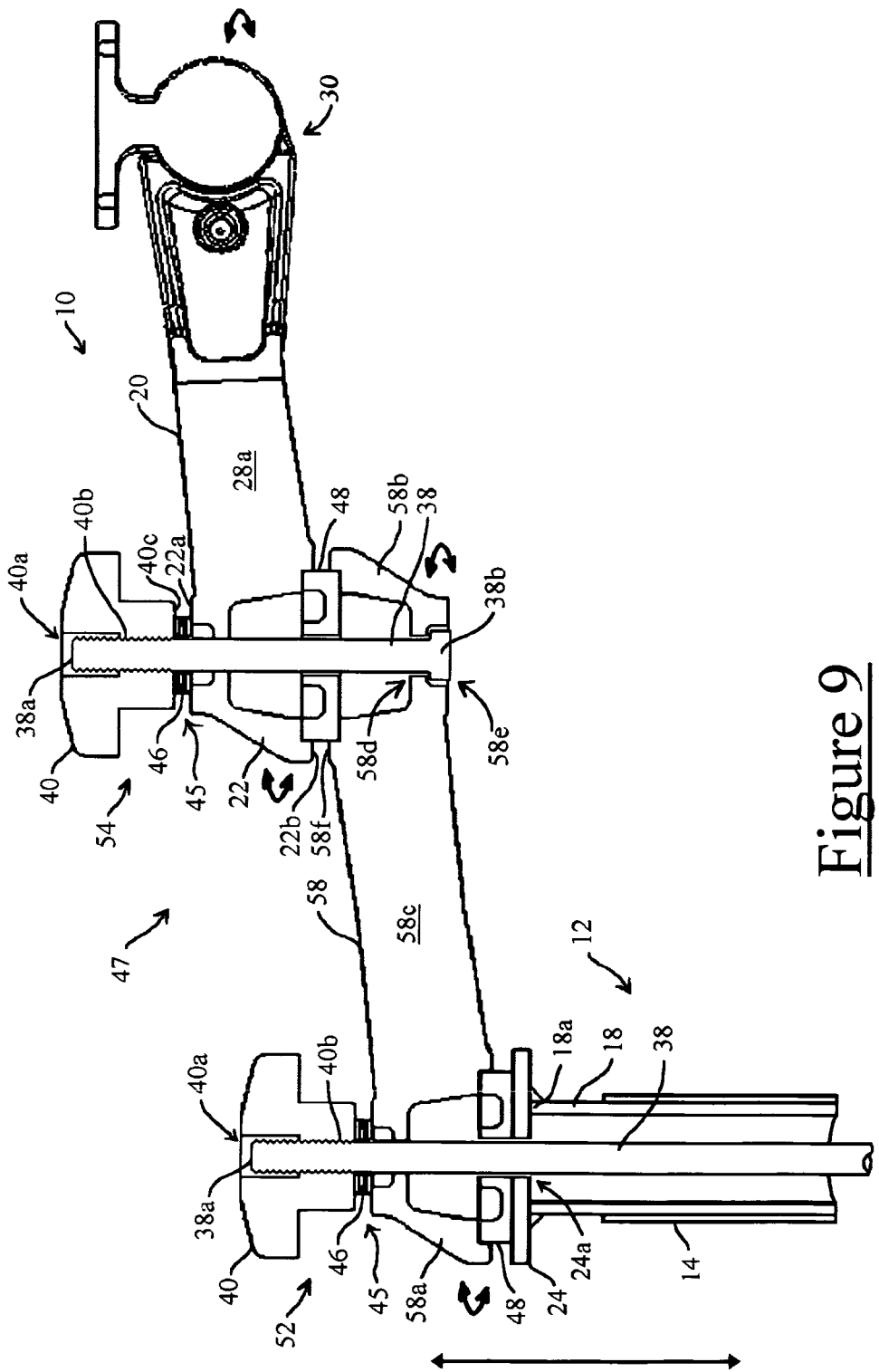
FIG. 9 is a close-up cross sectional view that illustrates one alternative embodiment of the telescoping pole of the present invention having a double arm mechanism.

FIG. 9 illustrates an alternative embodiment of the telescoping pole mount 10 having the double arm mechanism 47. As illustrated here, the double arm mechanism 47 is formed of the remote rotatable mechanical arm 20 together with a second inner mechanical arm 58 that is rotatable relative to the end 18a of the male tube 18. The second mechanical arm 58 is formed with a hub 58a that is substantially the same as the hub 22 of the arm 20 illustrated in earlier Figures and operates substantially the same. Optionally, the bushing 48 may be interfaced between the hub 58a and the platform 24 for easing rotation of the arm 58 about the telescoping pole 12. The mechanical arm 58 includes a second substantially identical hub 58b that is spaced remotely from the pole 12 by an arm extension 58c that interconnects the remote hub 58b to the hub 58a at the pole 12. The remote rotatable mechanical arm 20 is coupled for rotation relative to the inner arm's second hub 58b by the lengthwise clamping mechanism 54 that fixes the remote arm's rotatable hub 22 firmly against the inner arm's second hub 58b. By example and without limitation, the second coupler 38 operates in cooperation the second actuator 40 to rotatably couple the two hubs 22 and 58b. The second coupler 38 is coupled through the clearance passage 22c through the remote hub 22 and a similar clearance passage 58d through the inner arm's second hub 58b.

According to one embodiment of the invention, the oversized head 38b of the second coupler 38 and inner arm's second hub 58b are structured in a mutually cooperative manner as to keep the second coupler 38 from turning relative to the inner arm's second hub 58b. For example, the second coupler 38 is a conventional bolt having an enlarged square or hex shaped head 38b that is sized to fit with a mating square or hex shaped socket 58e in the hub 58b opposite from a contact surface 58f of the hub 58b. According to one embodiment of the invention, the bushing 48 is optionally interfaced between the second opposite contact surface 22b of the remote hub 22 portion of the remote mechanical arm 20 and the contact surface 58f of the inner arm's second hub 58b for easing rotation of the remote mechanical arm 20.

A second decoupling mechanism 45 of the invention is interfaced between the second actuator knob 40 and the remote hub 22 for decoupling rotation of the remote mechanical arm 20 from the second actuator knob's contact surface 40c, thereby overcoming the loosening of the lengthwise clamping mechanism 54. For example, a second thrust bearing 46 is interfaced between the second actuator 40 and the hub 22 of the remote rotatable mechanical arm 20.

Figure 10:
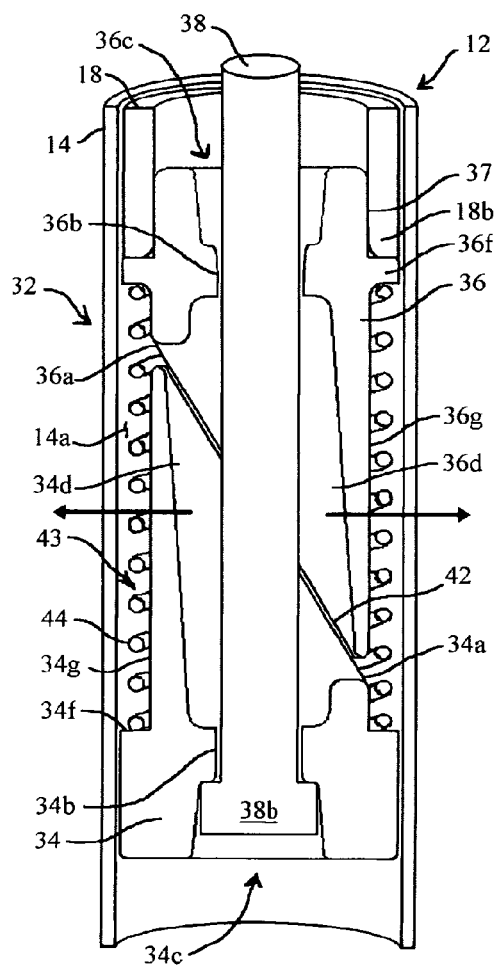
FIG. 10 is a close-up cross sectional view that illustrates an alternative embodiment of a disengaging mechanism of the invention for disengaging the lengthwise locking mechanism of the invention.
Figure 11:
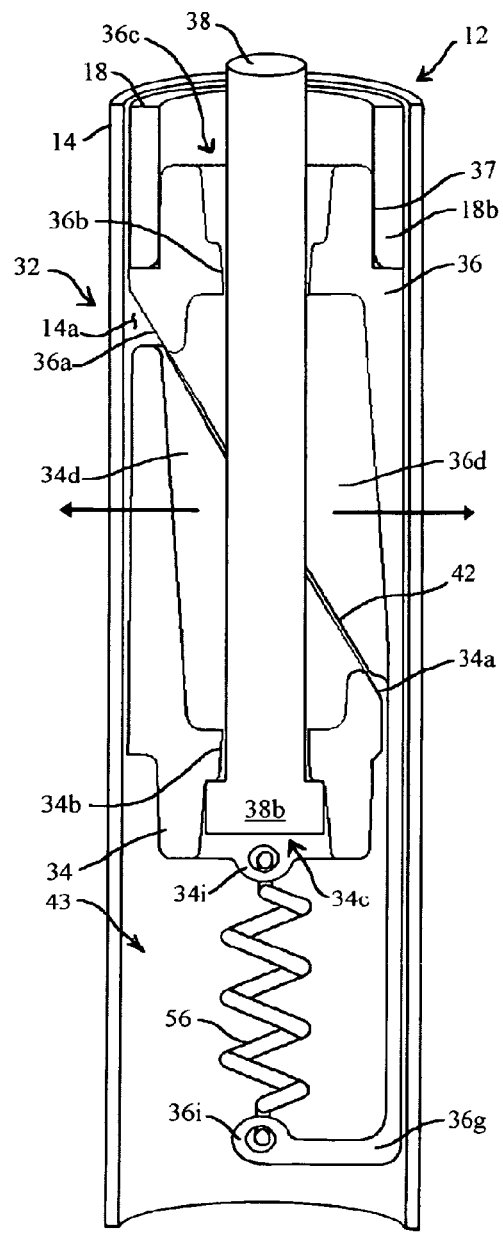
FIG. 11 is a close-up cross sectional view that illustrates another alternative embodiment of a disengaging mechanism of the invention for disengaging the lengthwise locking mechanism of the invention.

FIG. 10 illustrates another alternative embodiment of the disengaging mechanism 43 of the invention for disengaging the wedges 34, 36 from their interlocked relationship upon relief of the lengthwise tension of the threaded rod coupler 38. As illustrated here, the disengaging mechanism 43 is embodied as strong tension spring 56 for disengaging the wedges 34, 36 by pulling the farther wedge 34 away from the nearer wedge 36. As illustrated here, the tension spring 56 is positioned between the farther wedge 34 and an extension 34h of the nearer wedge 36 that is extended opposite from the inner male tube 18 beyond the farther wedge 34. By example and without limitation, the wedges 34, 36 are formed with opposing connectors 34i, 36i with the tension spring 56 stretched therebetween. The tension spring 56 is sized having an unstretched length that is shorter the spacing between the opposing connectors 34i, 36i such that the tension spring 56 must be stretched to fit between the opposing connectors 34i, 36i when the farther wedge 34 is drawn against the nearer wedge 36. Upon relief of the lengthwise tension of the threaded rod coupler 38, the tension spring force in the stretched spring 56 operates against the opposing connectors 34i, 36i of the wedges 34, 36 for pulling apart and disengaging the two interacting wedges 34, 36 to release the lengthwise locking mechanism 32. The tension spring 56 is sufficiently strong that, when the tension in the lengthwise rod coupler 38 is relieved, retraction of the stretched spring 56 overcomes the jamming force that holds the wedges 34, 36 against the inner wall 14a of the female tube 14.

The respective lengthwise hollow cavities 34d, 36d are irrelevant, except as means for lightening the wedges 34, 36 by removing unnecessary material.

Figure 12:
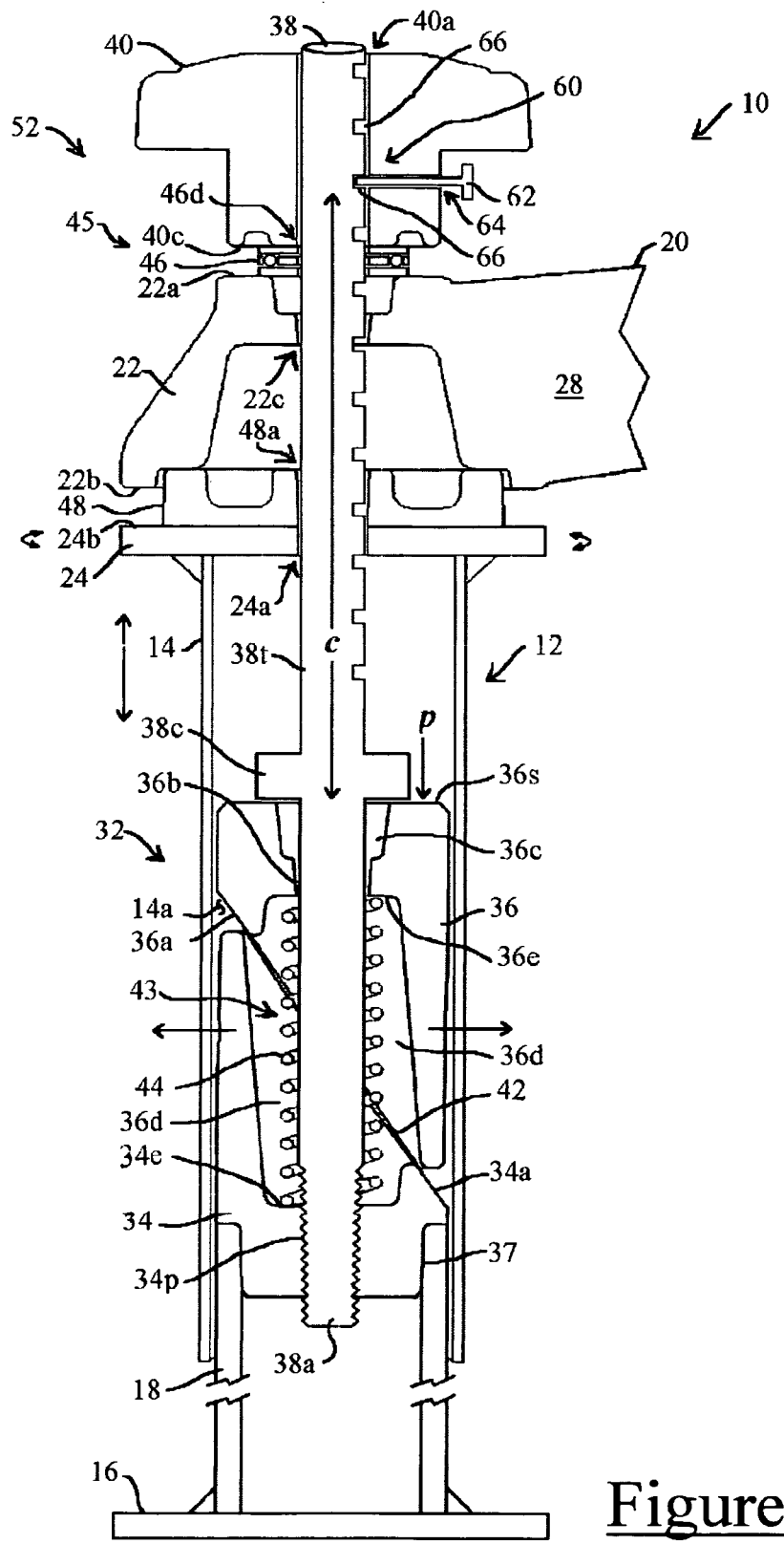
FIG. 12 cross sectional view that illustrates one alternative embodiment of the telescoping pole mount of the invention having an alternative embodiment of the lengthwise locking mechanism.

FIG. 12 illustrates one alternative embodiment of the telescoping pole mount 10 of the invention wherein the relative positions of the female and male tubes 14, 18 are reversed, with the male tube 18 being coupled to the base plate 16 and the female tube 14 being coupled to the platform 24. An alternatively embodiment of the lengthwise locking mechanism 32 is illustrated wherein the coupler 38 is reversed with its threaded end 38a inside the pole 12. The threaded end 38a of the reversed coupler 38 passes through the lengthwise clearance passage 36b in the nearer wedge 36 and is threaded into a lengthwise threaded passage 34p that is substituted for the lengthwise clearance passage 34b through the farther wedge 34. The farther wedge 34 is expected to be fixed to the male tube 18 by the joint 37. Accordingly, the farther wedge 34 is expected to be welded, threaded, swaged, keyed, pinned or otherwise coupled in a rotationally fixed relationship with the male tube 18. The coupler 38 is further formed with an enlarged boss 38c spaced along its trunk 38t from the threaded end 38a. The boss 38c and the nearer wedge 36 are structured in a mutually cooperative manner as to permit the coupler 38 to turn relative to the nearer wedge 36.

For example, the boss 38c is nearer wedge 36 relative to the socket 36c in the nearer wedge 36 as to be able to turn against a substantially planar aft surface 36s of nearer wedge 36 opposite from the incline surface 36a. Thus, the coupler 38 is able to pass partially through the nearer wedge 36 and turn within it, but the boss 38c forces the nearer wedge 36 against the farther wedge 34 by pushing against its aft surface 36s, as indicated by the arrow p. Alternatively, the boss 38c fits into and rotates within the socket 36c. Turning the coupler 38 in a first direction drives its threaded end 38a deeper through the threaded passage 34p in the farther wedge 34, which simultaneously forces the nearer and farther wedges 34, 36 together along their inclined plane of mutual contact 42. The cooperating wedges 34, 36 are thus forced to move crosswise to one another and laterally of the female tube 14, as indicated by the outwardly pointing arrows. As discussed herein, this relative crosswise motion drives the cooperating wedges 34, 36 to jam and wedge laterally against an inner wall 14a of the female tube 14. The cooperating wedges 34, 36 thus cause the locking mechanism 32 to fix the male tube 18 lengthwise of the female tube 14.

The trunk 38t of the coupler 38 slides through the lengthwise bore 40a in the knob actuator 40 that is extended to eliminate the internal female thread 40b. The threaded joint between the coupler 38 and actuator 40 is replaced by a temporary joint 60 for varying an effective length c of the coupler 38. By example and without limitation, the temporary joint 60 is formed by a pin 62 passing through a threaded or clearance (shown) passage 64 in the actuator 40 and into one of a series of holes 66 formed into the coupler 38 at intervals along the trunk 38t. Other structures are also contemplated for the temporary joint 60 and may be substituted without deviating from the scope and intent of the invention.

Mounting Platforms

Figure 13:
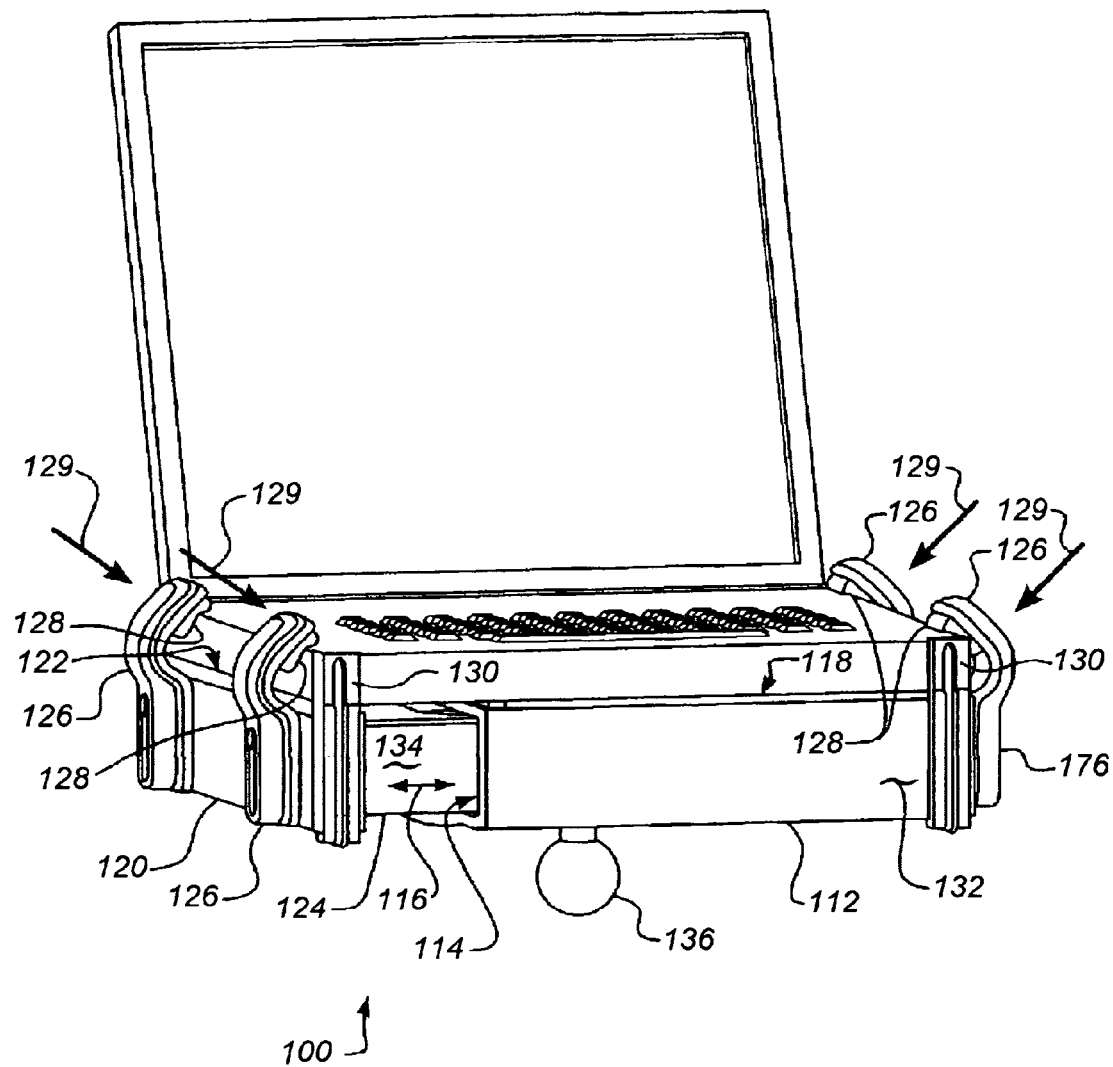
FIG. 13 illustrates the invention embodied as a mounting platform for various vehicle-mounted, after-market accessory devices, such as a portable computer (shown), a cellular telephone, a global positioning system (GPS) receiver, or another useful accessory device.
Figure 14:
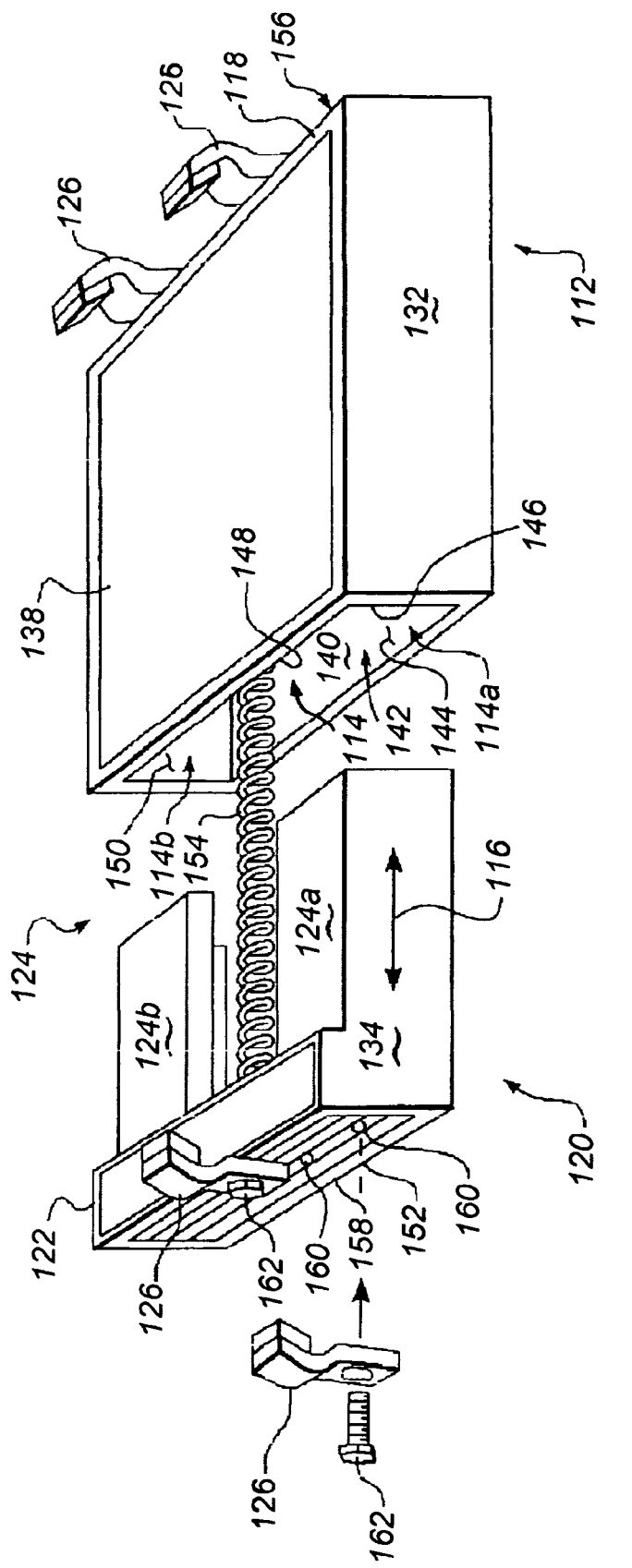
FIG. 14 is an exploded view of the mounting platform as shown in FIG. 13, wherein a portion of one first device mounting surface is formed with a relatively high coefficient of friction.

FIG. 13 illustrates the invention embodied as a mounting platform 100 for various vehicle-mounted, after-market accessory devices, such as a portable computer (shown), a cellular telephone, a global positioning system (GPS) receiver, or another useful accessory device. The mounting platform 100 includes a first frame or body portion 112 having an interior track 114 aligned along a first direction 116 and a first device mounting surface 118 adjacent to the track 114. A second frame or body portion 120 includes a second device mounting surface 122 adjacent to a slide 124 structured to slidably engage the track 114 along the first direction 116. A resilient member 154, shown in FIG. 14, is structured to engage each of the first and second body portions 112, 120 for urging the first and second body portions 112, 120 to approach one another along the first direction 116 when the slide 124 is slidably engaged with the track 114. At least one clamp member 126 is mounted on each of the first and second body portions 112, 120 in a manner projecting above the respective first and second device mounting surfaces 118, 122. Each clamp member 126 includes a clamping surface 128 facing toward the respective first and second body portions 112, 120 along the first direction 116 and being inclined relative to the respective first and second device mounting surfaces 118, 122. Multiple clamp members 126 are optionally provided, as shown, on one or both of the first and second body portions 112, 120.

As illustrated in FIG. 13, a substantially thin, flat base portion of the accessory device engages the first and second device mounting surfaces 118, 122 of the first and second body portions 112, 120. Thereafter, the inclined clamping surfaces 128 of the clamp members 126 engage opposing edges of an upper surface of the base portion of the accessory device that is spaced away from the device mounting surfaces 118, 122.

The resilient member 154 urging the first and second body portions 112, 120 to approach one another along the first direction 116 simultaneously urges the clamp members 126 to approach one another along the first direction 116 such that the inclined clamping surfaces 128 press on the opposing edges of the base portion upper surface to compress the upper surface of the accessory device downwardly toward the device mounting surfaces 118, 122, as indicated by the arrows 129. The device mounting surfaces 118, 122 are equipped with a relatively high coefficient of friction that operates in combination with the pressure applied by the inclined clamping surfaces 128 of the clamp members 126 to limit slippage of the accessory device relative to the device mounting surfaces 118, 122.

Optionally, one or more stops 130 are fixed to respective side surfaces 132, 134 of the first and second body portions 112, 120 in a manner projecting above the respective first and second device mounting surfaces 118, 122. The optional stop or stops 130 are useful for positioning the accessory device relative to the device mounting surfaces 118, 122. Furthermore, the optional stop or stops 130 add protection against slippage of the accessory device relative to the device mounting surfaces 118, 122 when the device mounting surfaces 118, 122 are tilted so that gravity would urge the accessory device to slip off of the device mounting surfaces 118, 122.

A mounting structure 136 is positioned on one of the first and second body portions 112, 120 for engaging a mounting device (not shown) in or on the vehicle. The mounting structure 136 is, for example, the compressible coupling member portion of the universally positionable mounting device shown and described in U.S. Pat. No. 5,845,885 issued to the inventor of the present invention on Dec. 8, 1998, which is incorporated in its entirety herein by reference, and the mounting device is the one shown and described in therein. Alternatively, the mounting structure 136 is, for example, the geodesic coupler shown and described in U.S. Pat. No. 6,581,892 entitled GEODESIC MOUNTING APPARATUS, issued to the name of the inventor of the present invention on Jun. 24, 2003, which is incorporated in its entirety herein by reference, and the mounting device is the one shown and described in therein. Alternatively, the mounting structure 136 is another suitable structure of conventional design.

FIG. 14 is an exploded view of the mounting platform 100 as shown in FIG. 13. As shown in here, a portion 138 of the first device mounting surface 118 of the first body portion 112 is equipped with a relatively high coefficient of friction. For example, the high friction portion 138 is a pad of material having a relatively high coefficient of friction. For example, a thin rubber sheet is adhered to the first device mounting surface 118, either with a suitable adhesive therebetween or using another conventional mechanical adhesion means. Alternatively, the high friction portion 138 is a sheet of conventional non-skid material, such as sand paper, adhered to the first device mounting surface 118. Optionally, the high friction portion 138 of the first device mounting surface 118 is formed with a grooved, knurled, serrated, slotted, or otherwise suitably roughened surface area in place of the rubber sheet or non-skid material.

The track 114 is shown in FIG. 14 embodied as a cavity 140 adjacent to the first device mounting surface 118. The cavity 140 includes an opening 142 thereinto and four interior planar surfaces 144, 146, 148, 150, each of the pairs of opposing interior surfaces 144, 148 and 146, 150 being mutually parallel and spaced apart and interconnected at the edges to the other respective pair. The four interior planar surfaces 144, 146, 148, 150 thus form two mutually parallel and spaced apart channel-shaped tracks 114a, 114b, the first channel-shaped track 114a being formed of the interior surface 146 and portions of the mutually parallel and spaced apart interior surfaces 144, 148 interconnected thereto at the edges, and the second channel-shaped track 114b being formed of the interior surface 150 and portions of the mutually parallel and spaced apart interior surfaces 144, 148 interconnected thereto at the edges.

The first body portion 112 is a drawer-like structure having the second device mounting surface 122 adjacent to the slide 124, which is embodied as a pair of slides 124a and 124b. The pair of slides 124a and 124b are structured to enter the cavity 140 in the first body portion 112 through the opening 142, and to slidably engage the tracks 114a, 114b, respectively, along the first direction 116. The pair of slides 124a and 124b are structured with sufficient stiffness or rigidity to support a portion of the weight of the accessory device on the second device mounting surface 122, while projecting in a cantilevered manner from the respective mating tracks 114a, 114b. The pair of slides 124a and 124b are optionally integrally formed with a base portion 152 and the second device mounting surface 122 formed thereon.

The cooperating slides 124a, 124b and tracks 114a, 114b are optionally formed differently from embodiment shown in FIG. 14. For example, the slides 124a, 124b are optionally formed as rods or tubes that slidably engage tracks 114a, 114b formed as mating tubular structures. According to another embodiment of the invention, the track 114 and slide 124 structure is formed as a conventional telescoping rod-and-tube structure of a type that is well-know in the mechanical arts. Other mating track-and-slide structures are generally well-known and are considered to be equivalents of the track 114 and slide 124 structure shown.

FIG. 14 also illustrates the resilient member 154 for urging the first and second body portions 112, 120 to approach one another along the first direction 116, wherein the resilient urging member 154 is embodied as a spring. The spring 154 is a tension spring coupled by conventional means at opposing ends to appropriate structure formed on each of the first and second body portions 112, 120. When the track 114 and slide 124 structures of the first and second body portions 112, 120 are engaged, the first and second body portions 112, 120 can be separated by a separating force exerted along the first direction 116. The spring 154 resists the separating force by increasing the spring tension force and thereby urges the first and second body portions 112, 120 back together. The cooperating track 114 and slide 124 structures ensure that relative motion between the first and second body portions 112, 120 is limited to motion along the first direction 116.

As described above, the tension force of spring 154 also brings the clamp members 126 into engagement with opposing upper surface edges of the base portion of the accessory device that is placed on the device mounting surfaces 118, 122. The respective end faces 156, 158 of the first and second body portions 112, 120 are structured for mounting one or more of the clamp members 126. For example, the end faces 156, 158 are formed with apertures 160 sized to accept a fastener 162, such as a screw or bolt and nut combination, for mounting each of the one or more of the clamp members 126.

The respective end faces 156, 158 of the first and second body portions 112, 120 are optionally formed with a relatively high friction surface area, such as a grooved, knurled, diamond, serrated, slotted, or otherwise suitably roughened surface area, that provides purchase for the one or more clamp members 126. The high friction surface permits each of the clamp members 126 to be positioned on the respective end faces 156, 158 while removing any opportunity for them to shift position. Thus, once the clamp members 126 are positioned appropriately for the base portion of a particular accessory device, the first and second body portions 112, 120 can be separated and accessory device inserted and remove multiple times without readjustment of the clamp members 126.

Figure 15A:
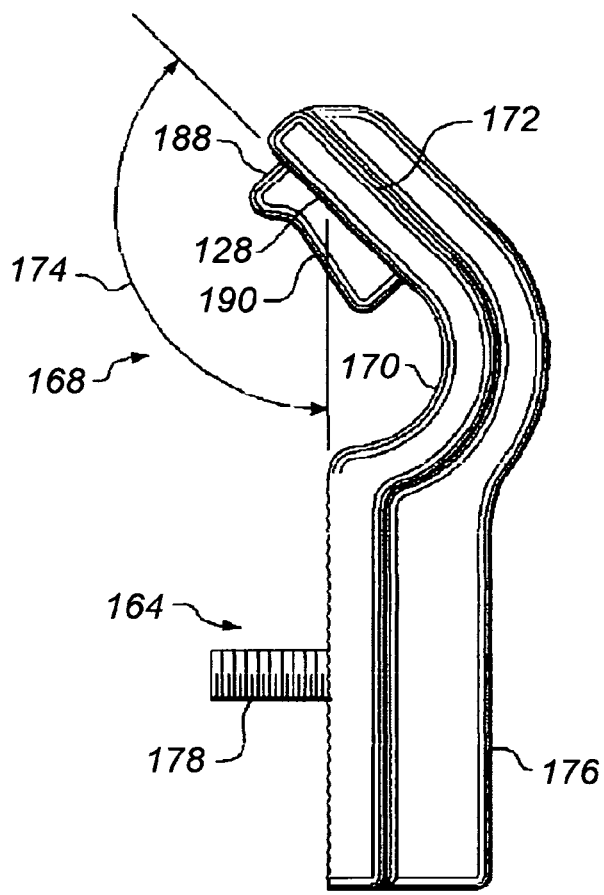
FIGS. 15A and 15B are respective side and end views that illustrate a clamp member embodied as an elongated finger having a base portion with a mounting surface and a crooked jaw portion extending therefrom.
Figure 15B:
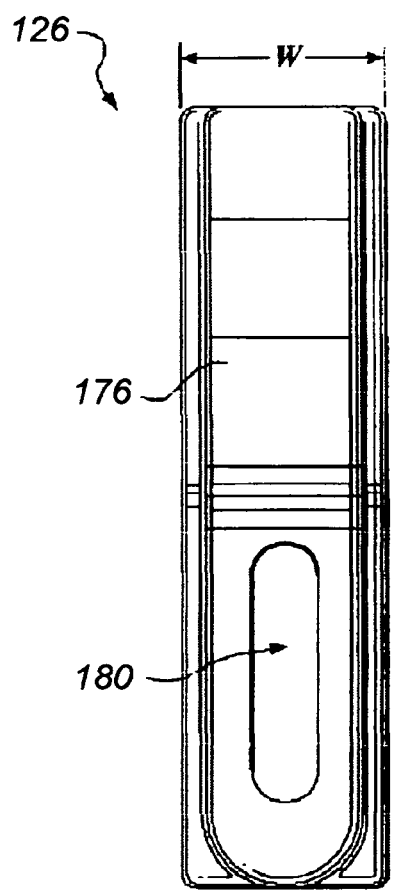

FIGS. 15A and 15B illustrate the clamp member 126 as an elongated finger having a base portion 164 with a mounting surface 166 and a crooked jaw portion 168 extending therefrom. FIG. 15A is a side view of the clamp member 126, and FIG. 15B is an end view thereof. The jaw portion 168 includes a curved neck portion 170 extending from the base portion 164 into a short straight portion 172 having the inclined clamping surface 128 formed as facet thereof. The straight portion 172 is formed at an appropriate predetermined obtuse angle 174 to the base portion 164. The angle 174 is about 135 degrees according to one embodiment of the invention, but according to other embodiments of the invention can optionally vary + or −15 degrees or more. When the clamp member 126 is installed on the end faces 156, 158 of the first and second body portions 112, 120, the jaw portion 168 extends above the respective first and second device mounting surfaces 118, 122. The angle 174 positions the short straight portion 172 of the jaw portion 168 with the inclined clamping surface 128 facing inwardly and downwardly toward the respective first and second device mounting surfaces 118, 122. The angle 174 permits the jaw portions 168 to engage the upper edges of the accessory device along the entire length of the inclined clamping surface 128 so that devices having base portions of different thicknesses are easily accommodated, without adjustments in the positions of the clamp members 126 relative to the device mounting surfaces 118, 122.

Optionally, the mounting surface 166 of the base portion 164 of each clamp member 126 is embodied having a relatively high friction surface, such as a grooved, knurled, diamond, serrated, slotted, or otherwise suitably roughened surface area, that is configured to cooperate with the high friction surface area formed on the respective end faces 156, 158 to eliminate slippage of the clamp member 126 relative to the respective end faces 156, 158. According to one embodiment of the invention, the high friction mounting surface 166 is a grooved surface when the cooperating high friction surface area on the end faces 156, 158 of the respective body portions 112, 120 are grooved surfaces.

Additionally, each clamp member 126 is optionally embodied having a stiffener portion 176 extending along part or all of its length for strengthening the clamp member 126 in the plane of the first direction 116 in which the clamping surface 128 acts.

FIG. 15A also shows that the mounting surface 166 of the base portion 164 is optionally embodied with threaded stud 178 that passes through one of the apertures 160 (shown in FIG. 14), thereby replacing the fastener 162 for mounting the clamp member 126. Optionally, the apertures 160 are embodied as slots in the end faces 156, 158 of the body portions 112, 120, whereby the clamp member 126 is selectively positionable relative to the respective body portions 112, 120 by moving the threaded stud 178 to different positions within the slot 160. The clamp member 126 is captured and held in place by engagement of a nut (not shown) onto the threaded stud 178 after it is passed through the slot 160 and selectively positioned relative to one of the respective end faces 156, 158.

As shown in FIG. 15B, each clamp member 126 includes an aperture 180 sized to accept the fastener 162 for fixing the clamp member 126 to one of the end faces 156, 158. Optionally, the aperture 180 is embodied as a slot aligned with the length of the base portion 164 so that the clamp member 126 can be moved relative to the body portions 112, 120, whereby the jaw portion 168 is spaced further away from or closer to the first and second device mounting surfaces 118, 122. The optional ability to move the clamp member 126 relative to the body portions 112, 120 thus accommodates accessory devices with base portions having a wider range of thicknesses.

Figure 15C:
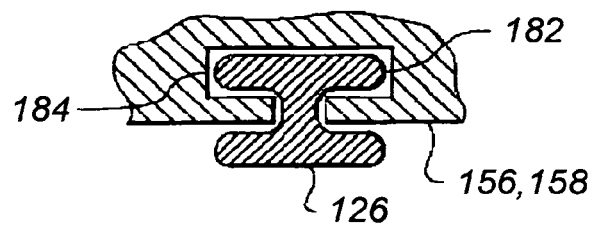
FIG. 15C is a bottom end view of the clamp member alternatively embodied using a tongue-and-groove structure for mating with the respective body portions.

FIG. 15C shows a bottom end view of the clamp member 126 alternatively embodied using a tongue-and-groove structure for mating with the respective body portions 112, 120. For example, the clamp member 126 is formed with an optional T-shaped flange 182 for joining with a cooperating slot structure 184 formed in the end faces 156, 158. The clamp member 126 is thus capable of movement, i.e., adjustment, relative to the first and second device mounting surfaces 118, 122 for accommodating accessory devices with base portions having a wider range of thicknesses.

Figure 15D:
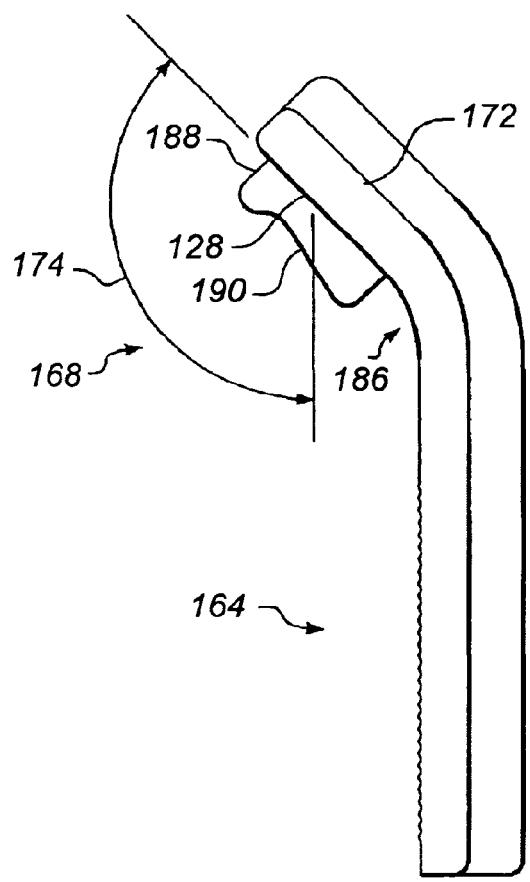
FIGS. 15D and 15E are respective side and end views that illustrate a simpler shape for the clamp member.

FIG. 15D shows the clamp member 126 embodied in a simpler shape having a single bend 186 between the base portion 164 and the short straight portion 172 of the jaw portion 168, but is otherwise substantially as described above. The single bend 186 is formed at the appropriate predetermined angle 174, which is again about 135 degrees according to one embodiment of the invention. The short straight portion 172 of the jaw portion 168 is positioned by the angle 174 to face inwardly and downwardly toward the respective device mounting surfaces 118, 122, and permits the jaw portion 168 to engage accessory devices having base portions of different thicknesses, without adjustments in the positions of the clamp members 126 relative to the device mounting surfaces 118, 122.

Figure 15E:
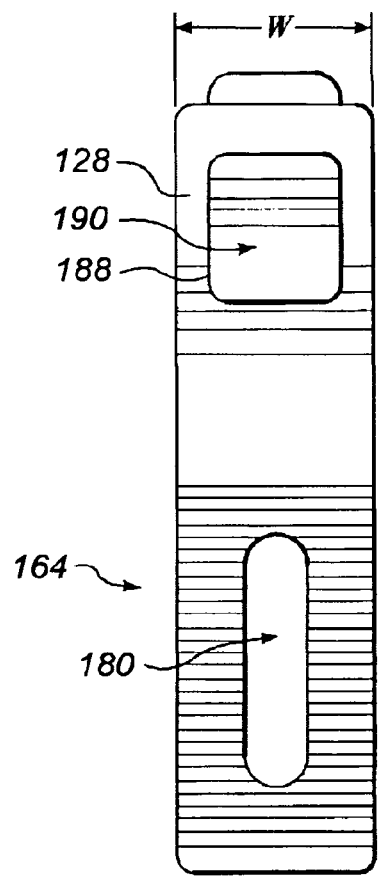

FIG. 15E is an end view of the alternative clamp member 126 shown in FIG. 15D and shows the high friction mounting surface 166 of the base portion 164 as a grooved surface that is interrupted by the slot 180.

The clamp member 126 as shown in FIGS. 15A through 15E is formed with an optional width W that can be as to merely accommodate a single slot 180 or T-shaped flange 182 and a minimal amount of material on either side thereof. However, the invention also contemplates a clamp member 126 having an optionally greater width W that, for example, is contiguous with a large portion or substantially all of the width of the end faces 156, 158 of the respective body portions 112, 120 and accommodates multiple slots 180 or T-shaped flanges 182. Thus, all such optional structures are considered to be equivalents of the clamp member 126 of the invention.

The clamp member 126 includes the inclined clamping surface 128, which is rotated at the angle 174 from the base portion 164, as described above. The inclined clamping surfaces 128 includes a portion 188 that is equipped with a relatively high coefficient of friction so that the clamping surface 128 grips the edge of the accessory device, rather than just compressing the accessory device into the device mounting surfaces 118, 122. For example, the high friction portion 188 is a pad of material having a relatively high coefficient of friction, such as a thin sheet of rubber or conventional non-skid material adhered to the inclined clamping surface 128. Optionally, the high friction portion 188 is formed with a grooved, knurled, serrated, slotted, or otherwise suitably roughened surface area in place of the rubber sheet or non-skid material.

According to one embodiment of the invention, the high friction portion 188 is embodied as a resilient cushion or pressure pad formed of an elastomeric material, such as rubber or a synthetic substitute. The pressure pad 188 is formed having a thickness and durometer that permits it to be compressed against the edge of the accessory device while remaining elastic. The pressure pad 188 thus operates as a spring compressed between the clamping surface 128 and the accessory device to maintain a substantial spring pressure against the accessory device. This spring pressure operates to press the press the accessory device against the device mounting surfaces 118, 122, thereby further limiting slippage of the device resulting from the jarring experienced during motion of the vehicle.

The pressure pad 188 optionally includes a contact surface 190 that is equipped with a relatively high coefficient of friction so that the pressure pad 188 grips the edge of the accessory device, rather than just compressing the accessory device into the device mounting surfaces 118, 122. For example, the high friction contact surface 190 is formed with a grooved, knurled, serrated, slotted, or otherwise suitably roughened surface area or is covered with a thin sheet of rubber or another non-skid material.

Locking Mounting Platforms

Figure 16:
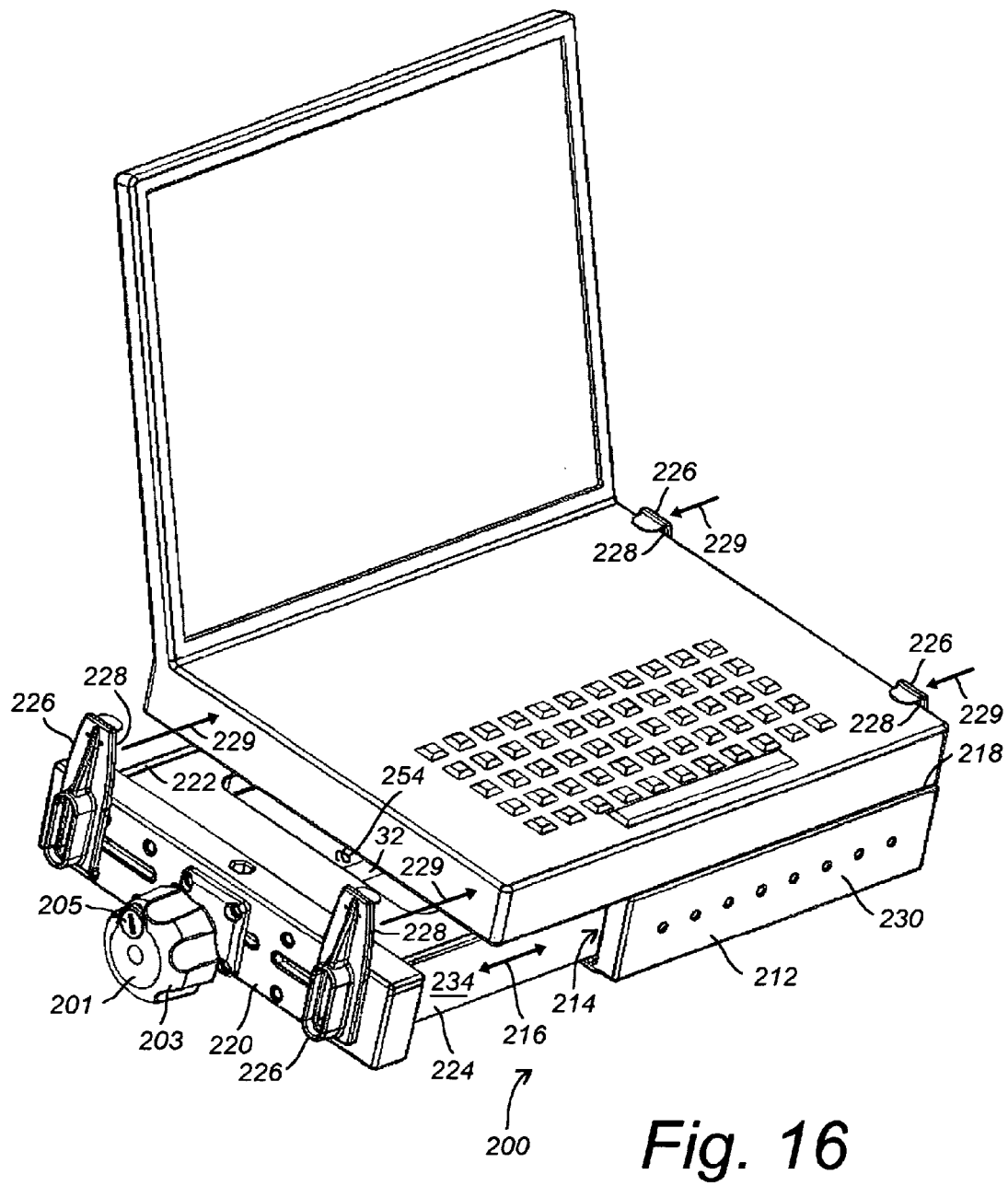
FIG. 16 illustrates an alternative locking embodiment of the mounting platform invention illustrated in FIG. 13, the mounting platform being illustrated here in an open position with a second body portion expanded relative to a first body portion for receiving an accessory device thereinto.

FIG. 16 illustrates the mounting platform 100 invention embodied as a locking telescoping platform 200 for various vehicle-mounted, after-market accessory devices, such as a portable computer (shown), a cellular telephone, a global positioning system (GPS) receiver, or another useful accessory device. Here, the mounting platform 200 is illustrated in an expanded or open position for receiving the accessory device thereinto. The mounting platform 200 includes a first frame or body portion 212 having an interior track 214 aligned along a first direction 216 and a first device mounting surface 218 adjacent to the track 214. A second frame or body portion 220 includes a second device mounting surface 222 adjacent to a slide 224 structured to slidably engage the track 214 along a first direction 216. A resilient biasing member 254, more clearly shown in subsequent figures, is coupled to engage each of the first and second body portions 212, 220 for urging the first and second body portions 212, 220 to approach one another along the first direction 216 when the slide 224 is slidably engaged with the track 214. At least one or more clamp member 226 is mounted on each of the first and second body portions 212, 220 in a manner projecting above the respective first and second device mounting surfaces 218, 222. Each clamp member 226 includes a clamping surface 228 facing toward the respective first and second body portions 212, 220 along the first direction 216. The clamp members 126 having the inclined clamping surfaces 128 are optionally substituted for one or more of the clamp members 226 with the inclined clamping surfaces 128 being inclined relative to the respective first and second device mounting surfaces 218, 222 without deviating from the scope and intent of the invention. Multiple clamp members 226 are optionally provided, as shown, on one or both of the first and second body portions 212, 220.

As illustrated here, a substantially flat base portion of the accessory device engages the first and second device mounting surfaces 218, 222 of the first and second body portions 212, 220. Thereafter, the clamping surfaces 228 of the clamp member 226, with or without the inclined clamping surfaces 128, engage opposing side and upper edge surfaces of the base portion of the accessory device above the device mounting surfaces 218, 222.

The resilient biasing member 254 urging the first and second body portions 212, 220 to approach one another along the first direction 216 simultaneously urges the clamp members 226 to approach one another along the first direction 216 such that the clamping surfaces 228 press on the opposing side and upper edge surfaces of the base portion upper surface to compress the upper surface of the accessory device inwardly of, and optionally downwardly toward, the device mounting surfaces 218, 222, as indicated by the arrows 229. The device mounting surfaces 218, 222 are optionally equipped with a relatively high coefficient of friction that operates in combination with the pressure applied by the clamping surfaces 228 of the clamp members 226 to limit slippage of the accessory device relative to the device mounting surfaces 218, 222.

Optionally, as illustrated in FIG. 13, one or more of the stops 130 are fixed to respective side surfaces 230, 234 of the first and second body portions 212, 220 in a manner projecting above the respective first and second device mounting surfaces 218, 222. The optional stop or stops 130 are useful for positioning the accessory device relative to the device mounting surfaces 218, 222. Furthermore, the optional stop or stops 130 add protection against slippage of the accessory device relative to the device mounting surfaces 218, 222 when the device mounting surfaces 218, 222 are tilted so that gravity would urge the accessory device to slip off of the device mounting surfaces 218, 222. The stops 130, when present, add security for the device mounted in the locking platform 200.

A mounting structure 236 is positioned on one of the first and second body portions 212, 220 for engaging a mounting device (not shown) in or on the vehicle. As illustrated in FIG. 13, the mounting structure 236 is, for example, the compressible coupling member portion of the universally positionable mounting device shown and described in U.S. Pat. No. 5,845,885 issued to the inventor of the present invention on Dec. 8, 1998, which is incorporated in its entirety herein by reference, and the mounting device is the one shown and described in therein. Alternatively, the mounting structure 236 is, for example, the geodesic coupler shown and described in U.S. Pat. No. 6,581,892 entitled GEODESIC MOUNTING APPARATUS, issued to the name of the inventor of the present invention on Jun. 24, 2003, which is incorporated in its entirety herein by reference, and the mounting device is the one shown and described in therein. Alternatively, the mounting structure 236 is another suitable structure of conventional design.

The locking platform 200 includes a keyed interlocking mechanism 201 operable between the first and second body portions 212, 220 and structured for forcibly holding the first and second body portions 212, 220 together along the first direction 216 when the slide 224 is slidably retracted along the track 214. For example, the interlocking mechanism 201 includes an actuator knob 203 that is secured in a known manner by a key lock 205. By example and without limitation, the interlocking mechanism 201 includes the lengthwise wedge locking mechanism 32 as discussed herein.

Figure 17:
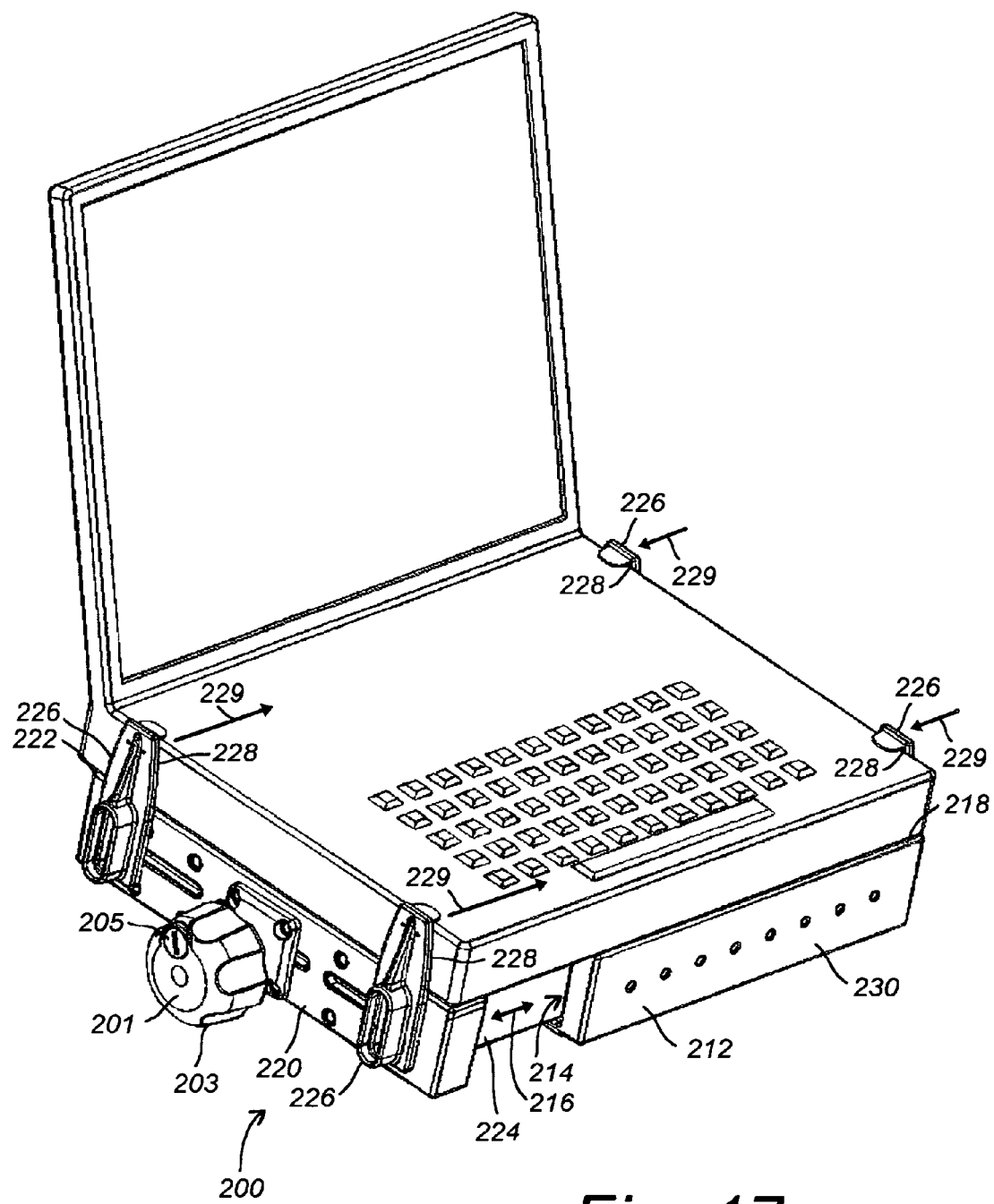
FIG. 17 illustrates the alternative locking platform of FIG. 16 in a closed position with the second body portion retracted relative to the first body portion for retaining the accessory device therein.

FIG. 17 illustrates the locking platform 200 in a closed position with the second body portion 220 retracted relative to the first body portion 212 for retaining the accessory device therein.

Figure 18:
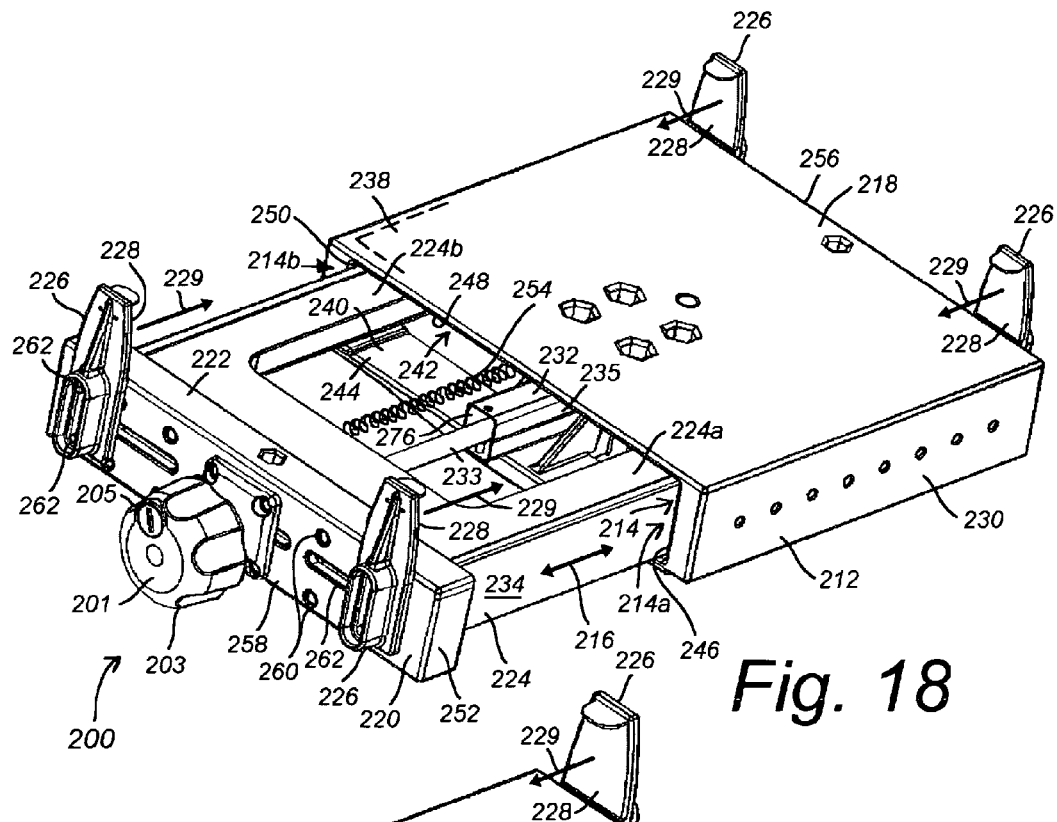
FIG. 18 is a perspective view of the alternative locking platform of FIGS. 16 and 17, with the accessory device being removed for clarity.

FIG. 18 is a perspective view of the mounting platform 200 as shown in FIGS. 16 and 17, with the accessory device being removed for clarity. Here, the mounting platform 200 is illustrated in an expanded or open position for receiving the accessory device thereinto. As shown in here, a portion 238 of the first device mounting surface 218 of the first body portion 212 is optionally equipped with a relatively high coefficient of friction. For example, the optional high friction portion 238 is a pad of material having a relatively high coefficient of friction. For example, a thin rubber sheet is adhered to the first device mounting surface 218, either with a suitable adhesive therebetween or using another conventional mechanical adhesion means. Alternatively, the optional high friction portion 238 is a sheet of conventional non-skid material, such as sand paper, adhered to the first device mounting surface 218. Alternatively, the optional high friction portion 238 of the first device mounting surface 218 is formed with a grooved, knurled, serrated, slotted, or otherwise suitably roughened surface area in place of the rubber sheet or non-skid material.

The track 214 is shown in FIG. 18 embodied as a cavity 240 adjacent to the first device mounting surface 218. The cavity 240 includes an opening 242 thereinto and four interior planar surfaces 244, 246, 248, 250, each of the pairs of opposing interior surfaces 244, 248 and 246, 250 being mutually parallel and spaced apart and interconnected at the edges to the other respective pair. The four interior planar surfaces 244, 246, 248, 250 thus form two mutually parallel and spaced apart channel-shaped tracks 214a, 214b, the first channel-shaped track 214a being formed of the interior surface 246 and portions of the mutually parallel and spaced apart interior surfaces 244, 248 interconnected thereto at the edges, and the second channel-shaped track 214b being formed of the interior surface 250 and portions of the mutually parallel and spaced apart interior surfaces 244, 248 interconnected thereto at the edges.

The first body portion 212 is a drawer-like structure having the second device mounting surface 222 adjacent to the slide 224, which is embodied as a pair of slides 224a and 224b. The pair of slides 224a and 224b are structured to enter the cavity 240 in the first body portion 212 through the opening 242, and to slidably engage the tracks 214a, 214b, respectively, along the first direction 216. The pair of slides 224a and 224b are structured with sufficient stiffness or rigidity to support a portion of the weight of the accessory device on the second device mounting surface 222, while projecting in a cantilevered manner from the respective mating tracks 214a, 214b. The pair of slides 224a and 224b are optionally integrally formed with a base portion 252 and the second device mounting surface 222 formed thereon.

The cooperating slides 224a, 224b and tracks 214a, 214b are optionally formed differently from embodiment shown in FIG. 18. For example, the slides 224a, 224b are optionally formed as rods or tubes that slidably engage tracks 214a, 214b formed as mating tubular structures. According to another embodiment of the invention, the track 214 and slide 224 structure is formed as a conventional telescoping rod-and-tube structure of a type that is well-know in the mechanical arts. Other mating track-and-slide structures are generally well-known and are considered to be equivalents of the track 214 and slide 224 structure shown.

FIG. 18 also illustrates the resilient biasing member 254 for urging the first and second body portions 212, 220 to approach one another along the first direction 216, wherein the resilient biasing member 254 is embodied as a spring. The biasing spring 254 is a tension spring coupled by conventional means at opposing ends to appropriate structure formed on each of the first and second body portions 212, 220. When the track 214 and slide 224 structures of the first and second body portions 212, 220 are engaged, the first and second body portions 212, 220 can be separated by a separating force exerted along the first direction 216. The biasing spring 254 resists the separating force by increasing the spring tension force and thereby urges the first and second body portions 212, 220 back together. The cooperating track 214 and slide 224 structures ensure that relative motion between the first and second body portions 212, 220 is limited to motion along the first direction 216.

As described above, the tension force of biasing spring 254 also brings the clamping surface 228 of the clamp members 226 into engagement with opposing surfaces of the base portion of the accessory device that is placed on the device mounting surfaces 218, 222. Respective end faces 256, 258 of the first and second body portions 212, 220 are structured for mounting one or more of the clamp members 226. For example, the end faces 256, 258 are formed with apertures 260 or slots 262 sized to accept a fastener 262, such as a screw or bolt and nut combination, for mounting each of the one or more of the clamp members 226. When the slots 262 are present, the clamp members 226 are movable along the respective end faces 256, 258 of the first and second body portions 212, 220.

As described in FIG. 14, the respective end faces 256, 258 of the first and second body portions 212, 220 are optionally formed with a relatively high friction surface area, such as a grooved, knurled, diamond, serrated, slotted, or otherwise suitably roughened surface area, that provides purchase for the one or more clamp members 226. The high friction surface permits each of the clamp members 226 to be positioned on the respective end faces 256, 258 while removing any opportunity for them to shift position. Thus, once the clamp members 226 are positioned appropriately for the base portion of a particular accessory device, the first and second body portions 212, 220 can be separated and accessory device inserted and remove multiple times without readjustment of the clamp members 226.

As illustrated here, the keyed interlocking mechanism 201 of this locking platform 200 includes another lengthwise wedge locking mechanism 232 coupled between the first and second body portions 212, 220 and operable by the key locking operation knob 203. By example and without limitation, the lengthwise wedge locking mechanism 232 includes an inner male spacer 233 formed as a sleeve or tube that is sized to slide into and out of mouth opening 276 of a female containment tube 235 and to slide lengthwise there within.

Figure 19:
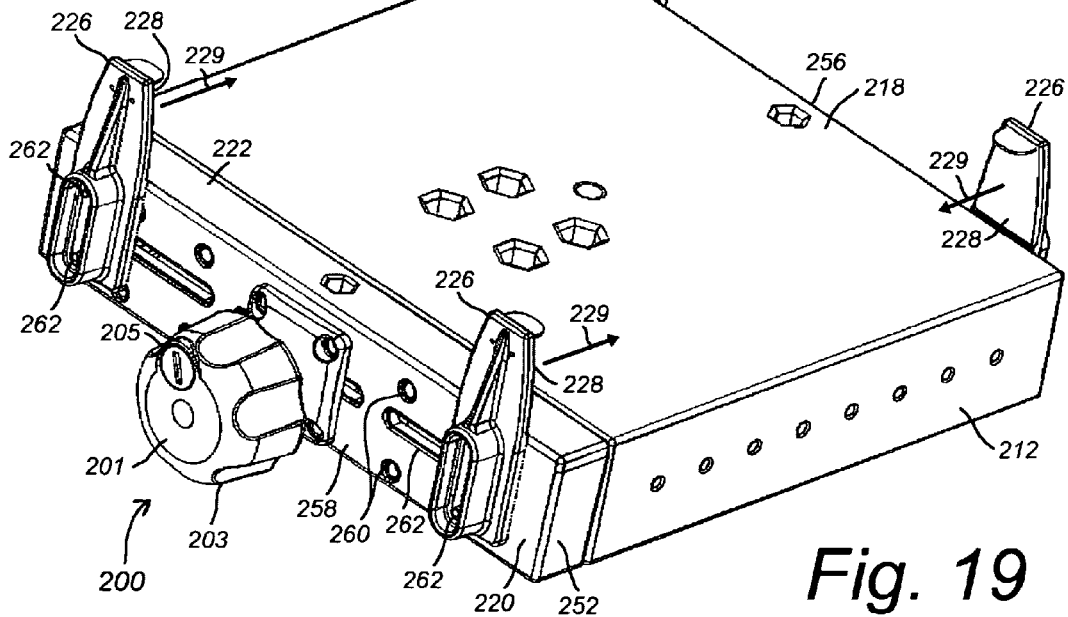
FIG. 19 illustrates the alternative locking platform of FIG. 16 in an open position retracted relative to the first body portion for retaining the accessory device therein, with the accessory device being removed for clarity.

FIG. 19 illustrates the locking platform 200 in a closed position with the second body portion 220 retracted relative to the first body portion 212 for retaining the accessory device therein, with the accessory device being removed for clarity.

Figure 20:
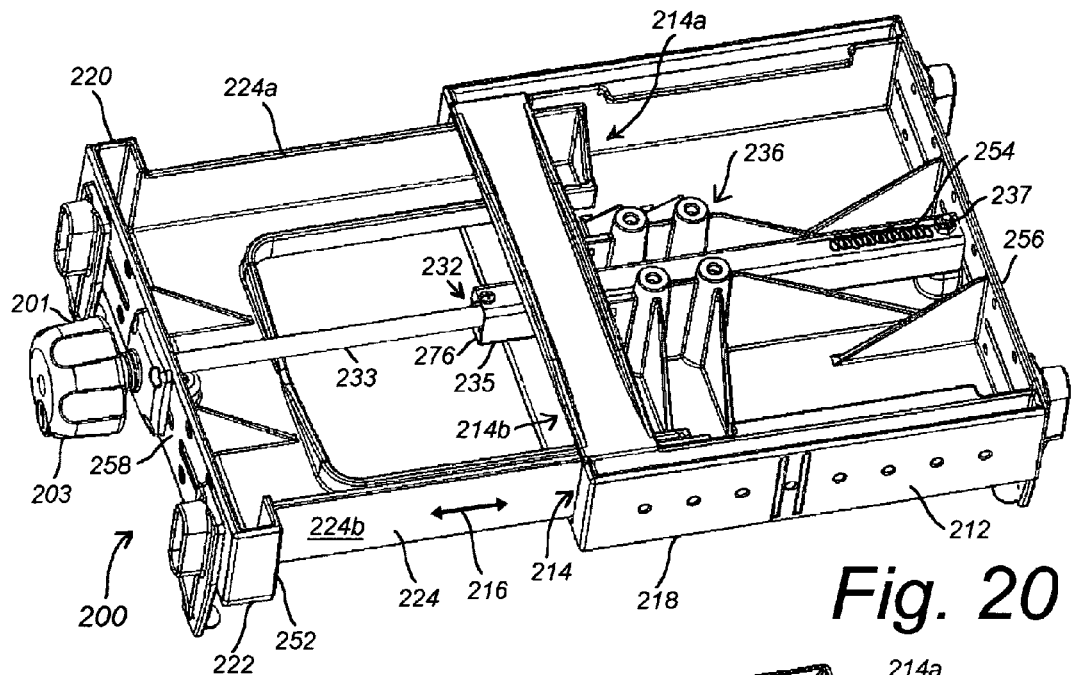
FIG. 20 is a bottom perspective view of the alternative locking platform of FIGS. 16 and 17.

FIG. 20 illustrates the locking platform 200 from opposite of the first and second device mounting surfaces 218, 222 with the second frame or body portion 220 being in an expanded or open position relative to the first frame or body portion 212 for receiving the accessory device thereinto, with the accessory device being removed for clarity. As illustrated here, the female tube portion 235 of the locking mechanism 232 extends at least partially through the track cavity 240 in the drawer-like first body portion 212 and through the opening 242 thereinto. The female containment tube 235 is substantially aligned along the first direction 216. As illustrated by example and without limitation, the female containment tube 235 extends to the end face 256 of the first body portion 212 and is coupled thereto, for example, by a fastener or other coupler 237. Optionally, as illustrated by example and without limitation in FIG. 22, et seq., the fastener or other coupler 237 does double duty by coupling the biasing spring 254 to the first body portion 212, for example adjacent to its end face 256. As also illustrated by example and without limitation in FIG. 22, et seq., another fastener or other coupler 231 coupling the biasing spring 254 to the second body portion 220, for example adjacent to its end face 258.

The inner male spacer portion 233 of the locking mechanism 232 extends at least partially the length of the second frame or body portion 220. As illustrated by example and without limitation, the inner male spacer portion 233 extends to the end face 258 of the second body portion 220. The inner male spacer 233 either floats, or is optionally fixed as by being affixed to the end face 258 of the second body portion 220 or coupled to the actuator knob portion 203 of the interlocking mechanism 201.

Figure 21:
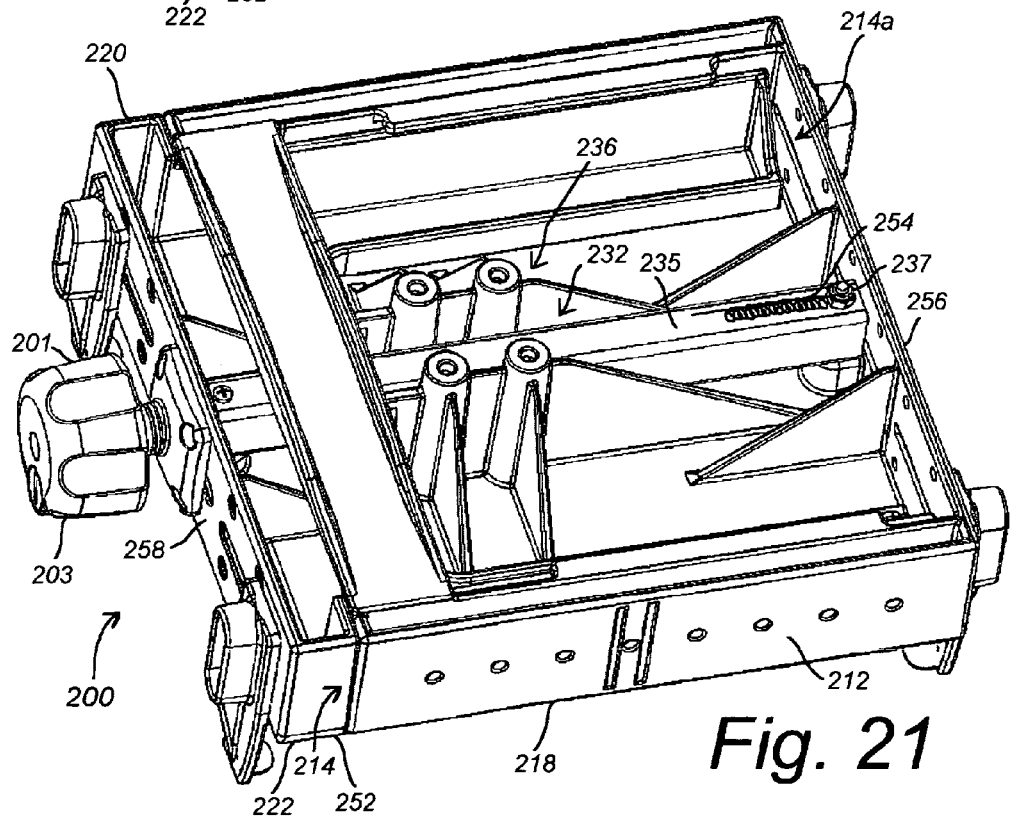
FIG. 21 is another bottom perspective view of the alternative locking platform of FIGS. 16 and 17.

FIG. 21 illustrates the locking platform 200 from opposite of the first and second device mounting surfaces 218, 222 with the second frame or body portion 220 being in a retracted or closed position relative to the first frame or body portion 212 for retaining the accessory device therein, with the accessory device being removed for clarity.

FIG. 22 is a cross-section through the locking platform 200 having the second frame or body portion 220 being in an expanded or open position relative to the first frame or body portion 212 for receiving the accessory device thereinto, with the accessory device being removed for clarity.

As illustrated here, the keyed interlocking mechanism 201 is similar in form and operation to the lengthwise wedge locking mechanism 32 as discussed herein: the telescoping interlocking mechanism 201 having at its core a telescoping pole formed of the outer female tube portion 235 similar in function and operation to the outer female tube 14, while the inner male spacer portion 233 is similar in function and operation to the inner male tube 18, except for variations discussed herein below. The telescoping interlocking mechanism 201 also includes a pair of cooperating wedges 239, 241 that are forced apart laterally by sliding along a sharply inclined plane of mutual contact 243 that is formed between respective inclined surfaces 239a, 241a when their combined lengthwise dimension is forcefully compressed. According to one embodiment of the invention, the cooperating wedges 239, 241 are substantially identical in configuration so that a single wedge form or mold is used to produce both of the pair of cooperating wedges 239, 241. However, substantial identity between the cooperating wedges 239, 241 is not necessary and may be eliminated in a practical application of the invention, as discussed herein below.

A lengthwise drive mechanism (generally at 253) of the invention cooperates with the lengthwise telescoping interlocking mechanism 201 for driving the cooperating wedges 239, 241 together along the inclined plane of mutual contact 243. By example and without limitation, the lengthwise drive mechanism 253 of the invention is configured to pull the inclined surface 239a of the farther wedge 239 against the inclined surface 241a of the nearer wedge 241 along the inclined plane of mutual contact 243. According to one embodiment of the invention, the lengthwise drive mechanism 253 of the invention is configured having a coupler 245 that is coupled to the actuator knob portion 203 of the telescoping interlocking mechanism 201. For example, the key lock 205 is operable in a known manner for engaging an disengageable interlock mechanism 247 between the actuator knob 203 and a near end 245c of the coupler 245 such that turning (indicated by arrow 249) of actuator knob 203 drives the interlocked coupler 245 in a rotational manner about a longitudinal axis 245b thereof relative to an annular reaction surface 206 formed on a collar 251 affixed to the end face 258 of the second body portion 220. For example, the coupler rod 245 passes through an aperture 210 in the collar 251 and extending through the end face 258 of the second body portion 220 with the annular reaction surface 206 being formed external of the collar 251.

The coupler 245 passes through a lengthwise passage 233a formed through the male sleeve or tube spacer 233, and further passes through both the nearer and farther wedges 241 and 239 and extends beyond the farther wedge 239. A far end portion 245a of the coupler 245 is formed with a threaded portion 257. The threaded end portion 257 of the coupler 245 is threadedly engaged with the farther wedge 239. By example and without limitation, the farther wedge 239 includes an internally threaded portion aligned with the first direction 216. Alternatively, as illustrated, the farther wedge 239 includes a receptor socket 259 shaped to receive a threaded compression member 261, such as a nut, in a manner that restricts the compression nut 261 from rotating when the coupler 245 is rotated as by turning the actuator knob 203. For example, when the compression nut 261 is a hex nut, the receptor socket 259 is a hex shaped recess slightly larger than the compression nut 261. Additionally, an anti-rotation mechanism 263 is provided at least for restraining the compression nut 261 or other threaded compression means from rotating when the coupler 245 is rotated. The anti-rotation mechanism 263 is, by example and without limitation, further structured to restrain the farther wedge 239 from rotating when the coupler 245 is rotated, whereby the receptor socket 259 and the compression nut 261 therein are in turn restrained from rotating. By example and without limitation, the anti-rotation mechanism 263 is provided between at least the farther wedge 239 and the female tube portion 235 of the locking mechanism 232. By example and without limitation, the female tube portion 235 has a female inner rectangular shape extruded along the first direction 216, and at least the farther wedge 239, and optionally the nearer wedge 241 as well, has a cooperating male external rectangular shape such that the farther wedge 239 is restricted from rotating inside the female containment tube 235.

By example and without limitation, the coupler 245 is embodied as an elongated bolt or threaded rod that is extended lengthwise through the lengthwise passage 233a of the inner male tube spacer 233 and the two cooperating wedges 239, 241 and spins freely therein. The interlock mechanism 247 rotationally couples the actuator knob 203 to the coupler rod 245. Turning (arrow 249) the knob actuator knob 203 causes a drive contact surface 204 thereof to act against the annular reaction surface 206 of the collar 251 or other portion of the end face 258 of the second body portion 220 in a first tightening direction turns the threaded end portion 257 of the coupler rod 245 within the nut 261 or other threaded means, which draws (indicated by arrow 265) the nut 261 or other threaded means toward the collar 251 or other portion of the end face 258 of the second body portion 220.

According to different embodiments of the platform 200, the actuator knob 203 alternatively works either directly against the annular reaction surface 206 of the collar 251 or other portion of the end face 258, or through an aperture 212 in an intervening decoupler 208 (shown here). For example, the intervening decoupler 208 is a bushing or thrust bearing installed to interface between the drive contact surface 204 of the threaded knob actuator 203 and the reaction surface 206 of the collar 251 or other portion of the end face 258. When present, the intervening bushing or thrust bearing decoupler 208 decouples the rotational drive of the reaction surface 206 of the collar 251 or other portion of the end face 258 from the actuator knob's drive contact surface 204. Alternatively, the actuator knob 203 is of a type having a built-in decoupler mechanism such that the intervening decoupler 208 (shown here) is redundant.

The drawing (arrow 265) of the nut 261 or other threaded means toward the collar 251 or other portion of the end face 258 of the second body portion 220 in turn draws the farther wedge 239 toward the actuator knob 203 and the end face 258 of the second body portion 220, thereby drawing the farther wedge 239 against the nearer wedge 241 by pulling the nut 261 or other threaded means along the coupler rod 245 toward the end face 258 of the second body portion 220 which slides the farther wedge 239 along the coupler rod 245.

Drawing the farther wedge 239 along the coupler rod 245 toward the collar 251 or other portion of the end face 258 of the second body portion 220 forces the farther wedge 239 against the nearer wedge 241 along the sharply inclined contact plane 243 between respective inclined surfaces 239a, 241a. However, the male spacer 233 restrains the nearer wedge 241 from sliding or traveling along the coupler rod 245 under such force. Whether fixed or floating, the male spacer 233 restrains the nearer wedge 241 from backing away from the approaching farther wedge 239 toward the end face 258 of the second body portion 220. Optionally, a resiliently compressible compensation mechanism 267 compensates for slight movements of the nearer wedge 241 on the coupler rod 245 during activation of the locking mechanism 232. By example and without limitation, the resiliently compressible compensation mechanism 267 is a stiff compression spring inserted between the male spacer 233 and the nearer wedge 241, which permits slight adjustment of the wedges 239, 241 in the female tube portion 235 of the locking mechanism 232 during tightening of the coupler rod 245 in the nut 261 and thereby compensates for slight movements of the nearer wedge 241 on the coupler rod 245.

Other lengthwise drive mechanisms 253 are also contemplated for drawing the farther wedge 239 against the nearer wedge 241 and may be substituted without deviating from the scope and intent of the invention. For example, a cam and lever are optionally substituted for the threaded coupler rod 245 and knob actuator knob 203 of the lengthwise drive mechanism 253.

An optional containment means 269 is provided for retaining the cooperating wedges 239, 241 on the coupler rod 245 in the event an inadvertent attempt is made to turn the coupler rod 245 too far during release of the lengthwise telescoping interlocking mechanism 201. By example and without limitation, when present the optional containment means 269 is embodied as a lock nut threaded onto a far end 245a of the coupler rod 245 sufficiently far from the cooperating wedges 239, 241 as to avoid interference with operation of the locking mechanism 232. Other containment means 269 are also contemplated and may substituted without deviating from the scope and intent of the invention. For example, a pin may be fit into or through a hole in the coupler rod end 245a, or when the coupler rod 245 is a long bolt the head portion may be positioned at the far end 245a to retain the cooperating wedges 239, 241 thereon.

An optional stop 275 is provided to retain the cooperating wedges 239, 241 within the female containment tube 235. For example, when present the optional stop 275 is a pin or screw constricting or blocking the tube mouth 276.

In operation, actuation or turning the actuator knob 203 drives the compression nut 261 along the coupler rod 245 in the direction 265 toward the actuator knob 203, which simultaneously draws the farther cooperating wedge 239 lengthwise of the female containment tube 235 and against the nearer cooperating wedge 241, while the male spacer 233 restricts the nearer wedge 241 from moving in the same direction 265. The cooperating wedges 239, 241 are forced together along the first direction 216 and, the nearer wedge 241 being unable to move along the coupler rod 245, the respective sharply inclined wedge surfaces 239a, 241a interact along the sharply inclined plane of mutual contact 243, which interaction forces the cooperating wedges 239, 241 to move crosswise to one another and laterally of the female containment tube 235, as indicated by the outwardly pointing arrows. This relative crosswise motion drives the cooperating wedges 239, 241 to jam and wedge laterally against opposing inner walls 235a, 235b of the female containment tube 235. The cooperating wedges 239, 241 thus cause the locking mechanism 232 to fix the coupler rod 245 lengthwise of the female containment tube 235.

The key lock 205 is unlocked for disengaging the interlock mechanism 247 between the actuator knob 203 and the coupler 245 so that turning (indicated by arrow 249) of actuator knob 203 causes the knob 203 to freely rotate independently of the unlocked coupler 245 and without driving the same.

Relocking the key lock 205 re-engages the interlock mechanism 247 between the actuator knob 203 and the coupler 245 so that turning (indicated by arrow 249) of actuator knob 203 causes the locked coupler 245 to turn. Reverse actuation or turning of the actuator knob 203 reverses the compression nut 261 on the coupler rod 245, which permits the farther wedge 239 to back away from the nearer wedge 241 along the plane of contact 243. With the lengthwise tension of the coupler rod 245 and compression nut 261 thus relieved, both wedges 239, 241 return to their normal positions central of the female containment tube 235 and are slidable therein along the first direction 216. The lengthwise locking mechanism 232 is thus released, which permits withdrawal of the end face 258 of the second body portion 220 along the first direction 216 relative to the first frame or body portion 212.

Re-engaging the locking mechanism 232 fixes the end face 258 of the second body portion 220 in a new position relative to the first frame or body portion 212, as illustrated by example and without limitation FIGS. 17, 19, 21 and FIGS. 24, 25, 26.

Also illustrated here is one exemplary embodiment of the invention for overcoming the disengagement resistance of prior art wedge mechanisms. In prior art devices, a sharp rap or other activation must be applied to disengage prior art wedge mechanisms from their interlocked relationship because they became so effectively jammed against one another and the wall of the tubes.

According to one embodiment of the invention, the decoupler or disengaging mechanism 43 as discussed herein is provided for disengaging the wedges 239, 241 from their interlocked relationship. As illustrated here, the decoupler or disengaging mechanism 43 is embodied as the strong compression spring 44 for disengaging the wedges 239, 241, for example by pushing the farther wedge 239 away from nearer wedge 241, as indicated by arrow 277. For example, the compression spring 44 is positioned between the cooperating wedges 239, 241. By example and without limitation, the wedges 239, 241 are formed with respective lengthwise hollow cavities 271, 273 that communicate with one another along the plane of contact 243. The compression spring 44 is compressed to fit into the communicating cavities 271, 273. The spring 44 is sized having an uncompressed length that is longer than a combined length of the communicating lengthwise cavities 271, 273 in the respective wedges 239, 241. When the farther wedge 239 is drawn against the nearer wedge 241, the compression spring 44 is compressed within the lengthwise cavities 271, 273 between the opposing wedges 239, 241. However, when effectively compressed, the compressed length of the spring 44 does not interfere with engagement of the inclined wedge surfaces 239a, 241a along the plane of contact 243 and consequent lateral spreading of the wedges 239, 241 during activation or engagement of the locking mechanism 232.

The disengaging spring 44 of the disengaging mechanism 43 is selected to be less strong or have a lesser spring rate than the compensation spring 267 between the nearer wedge 241 and the male spacer 233. This inequality in strength, i.e., spring rate, permits the compensation spring 267 to overpower the disengaging spring 44 during activation or engagement of the locking mechanism 232. Tightening of the compression member or nut 261 compresses the weaker or lower spring rate disengaging spring 44 more rapidly than compressing the stiffer or higher spring rate compensation spring 267. Thus, tightening of the compression member or nut 261 compresses the disengaging spring 44 inside the communicating lengthwise cavities 271, 273 and expands the opposing wedges 239, 241 outwardly, as indicated by the arrows, without completely compressing the stiffer compensation spring 267. The greater strength or spring rate of the stiffer compensation spring 267 causes it to retain just a minimum compressibility after the wedges 239, 241 are initially set between the opposing walls 235a, 235b of the female containment tube 235. This minimum compressibility permits continued tightening of the compression nut 261 on the coupler rod 245 to firmly set the wedges 239, 241 between the opposing tube walls 235a, 235b by permitting the coupler rod 245 to drag the wedges 239, 241 along the first direction 216 within the female containment tube 235, without requiring a complementary movement of the end face 258 of the second body portion 220 toward the first body portion 212. The clamp members 226 can thus be initially firmly set against the sides of the accessory device, as by tension of the resilient biasing member 254, while the lengthwise locking mechanism 232 is still disengaged. Thereafter, actuation or turning of the coupler rod 245 drags the cooperating wedges 239, 241 along the female containment tube 235 until the wedges 239, 241 first engage and then firmly set against the opposing tube walls 235a, 235b thus fixing the length of the platform 200 around the accessory device sitting on the respective first and second device mounting surfaces 218, 222. Else, without the minimum additional lengthwise play provided by the remaining compressibility of the compensation spring 267, continued actuation or turning of the coupler rod 245 in the compression nut 261 would force the second body portion 220 to move farther toward the first body portion 212 along the first direction 216. Such continued movement of the second body portion 220 farther toward the first body portion 212 after the clamp members 226 are already firmly set against the sides of the accessory device would tend to crush the accessory device therebetween, thereby potentially damaging the accessory device. The remaining play or compressibility of the compensation spring 267 thus protects the accessory device from over tightening of the first and second body portions 212, 220 while the cooperating wedges 239, 241 of the locking mechanism 232 is firmly engaged with the containment tube 235.

Upon relief of the lengthwise tension of the coupler rod 245, expansion spring force of the compressed spring 44 operates within the opposing wedge lengthwise cavities 271, 273 as discussed herein. The expansion spring force operates to push apart and disengage the two interacting wedges 239, 241 to release the lengthwise locking mechanism 232. The expansion force in the spring 44 is sufficiently strong that, when the tension in the lengthwise coupler rod 245 is relieved, decompression and expansion of the spring 44 overcomes the jamming force that holds the wedges 239, 241 against the inner walls 235a, 235b of the female containment tube 235. Disengagement from the tube inner walls 235a, 235b permits the wedges 239, 241 to return to their normal positions central of the female containment tube 235 where they slide freely. The lengthwise locking mechanism 232 is released, and the disengaged wedges 239, 241 are free to be repositioned relative to the female containment tube 235, which thereby permits the end face 258 of the second body portion 220 to be repositioned relative to the drawer-like first body portion 212. In other words, the second body portion 220 can be pulled drawer-like from the first body portion 212 against the spring pressure of the resilient biasing member 254 for removal of the accessory device from between the clamp members 226 and retrieval from the locking platform 200.

FIG. 23 is a bottom perspective cross-section view of the locking platform 200 that better illustrates some aspects of the locking mechanism 232, including the cooperating wedges 239, 241.

FIG. 24 is a blow-up view of the locking platform 200 that better illustrates some aspects of the locking mechanism 232, including the cooperating wedges 239, 241.

FIG. 25 is a cross-section through the locking platform 200 having the second frame or body portion 220 being in a closed or retracted position relative to the first body portion 212 for retaining the accessory device therein, with the accessory device being removed for clarity. Here, the interlock mechanism 247 rotationally couples the actuator knob 203 to the coupler rod 245 so that turning (arrow 249) or otherwise actuating the knob actuator knob 203 against the reaction surface 206 of the collar 251 or other portion of the end face 258 of the second body portion 220 turns the threaded end portion 257 of the coupler rod 245 within the nut 261 or other threaded means. The nut or other threaded means 261 can thus be drawn (arrow 265) toward the collar 251 or other portion of the end face 258 of the second body portion 220, which in turn draws the farther wedge 239 toward the actuator knob 203 and the end face 258 of the second body portion 220, thereby drawing the farther wedge 239 against the nearer wedge 241 by pulling the nut 261 or other threaded means along the coupler rod 245 toward the end face 258 of the second body portion 220 which slides the farther wedge 239 along the coupler rod 245. Alternatively, the coupled interlock mechanism 247 is utilized for turning the coupler rod 245 in another opposite direction when the knob actuator knob 203 is turned (arrow 249) or otherwise actuated for loosening or disengaging the wedge locking mechanism 232 relative to the inner walls 235a, 235b of the female containment tube 235. The compression spring 44 of the disengaging mechanism 43 disengages the wedges 239, 241 and permits the coupler rod 245 to slide along the first direction 216 lengthwise of the female containment tube 235.

Figure 26:
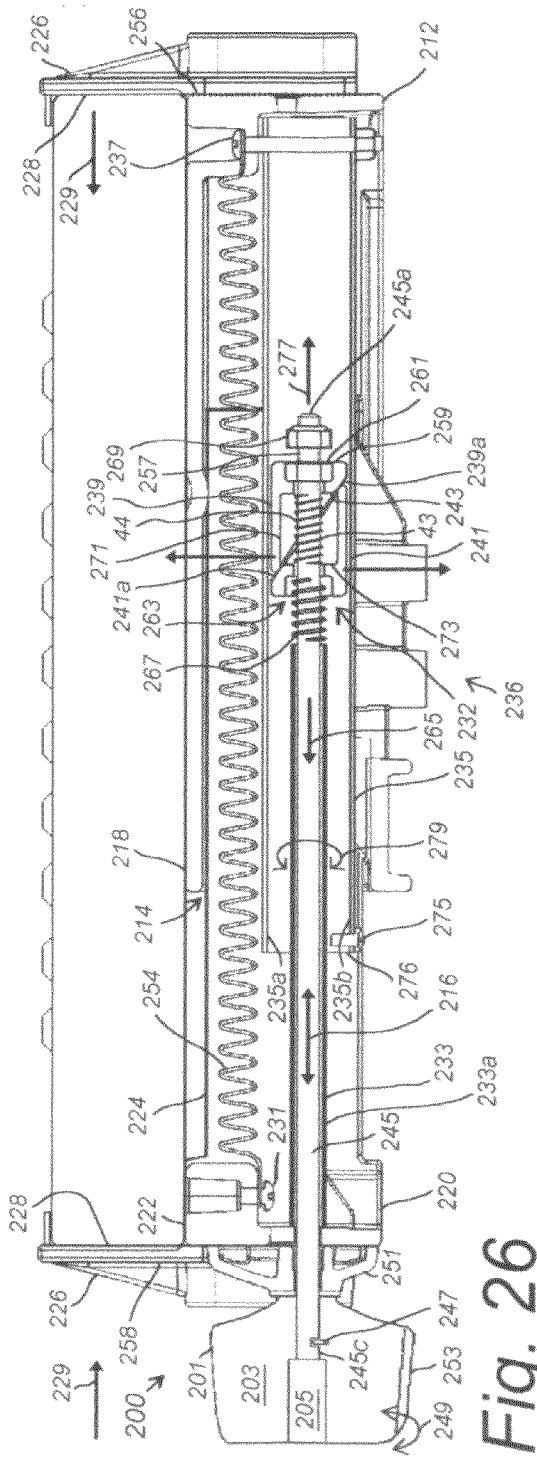
FIG. 26 is a cross-section through the alternative locking platform having the second frame or body portion being in a closed or retracted position relative to the first body portion for retaining the accessory device therein, with the accessory device being shown by example and without limitation.

FIG. 26 is a cross-section through the locking platform 200 having the second frame or body portion 220 being in a closed or retracted position relative to the first body portion 212 for retaining the accessory device therein, with the accessory device being shown by example and without limitation. Here, the engaged interlock mechanism 247 rotationally couples the actuator knob 203 to the coupler rod 245 so that turning (arrow 249) or other actuation of the actuator knob 203 against the reaction surface 206 of the collar 251 or other portion of the end face 258 of the second body portion 220 actuates the wedge locking mechanism 232. By example and without limitation, the actuation of the actuator knob 203 turns the threaded end portion 257 of the coupler rod 245 within the nut or other threaded means 261. When the interlock mechanism 247 is engaged with the knob actuator knob 203, the actuator knob 203 is turned (arrow 249) for turning (arrow 279) the coupler rod 245 within the lengthwise passage 233a of the male tube spacer 233 for disengaging or loosening the wedge locking mechanism 232 relative to the inner walls 235a, 235b of the female containment tube 235. When the coupler rod 245 is turned (arrow 279) sufficiently in the disengaging or loosening direction, the nut or other threaded means 261 is backed sufficiently along the far threaded end portion 257 of the coupler 245 to relax the compensation spring 267 between the nearer wedge 241 and the male spacer 233. When the compensation spring 267 is sufficiently relaxed, the compression spring 44 of the disengaging mechanism 43 is able to expand for disengaging the wedges 239, 241, for example by pushing the farther wedge 239 away from the nearer wedge 241 (arrow 277), and permits the male spacer 233 and the coupler rod 245 therein to slide lengthwise of the female containment tube 235. The loosened or disengaged wedge locking mechanism 232 thus permits moving of the second frame or body portion 220 along the first direction 216 relative to the first body portion 212. For example, the second frame or body portion 220 can be moved along the first direction 216 relative to the first body portion 212 to bring the clamping surfaces 228 of the clamp members 226 firmly against the accessory device to retain the mounted accessory device securely on the respective first and second device mounting surfaces 218, 222 of the first and second body portions 212, 220. Alternatively, the loosened or disengaged wedge locking mechanism 232 permits moving of the second frame or body portion 220 along the first direction 216 relative to the first body portion 212 for retrieving the accessory device from the locking platform 200.

Figure 27:
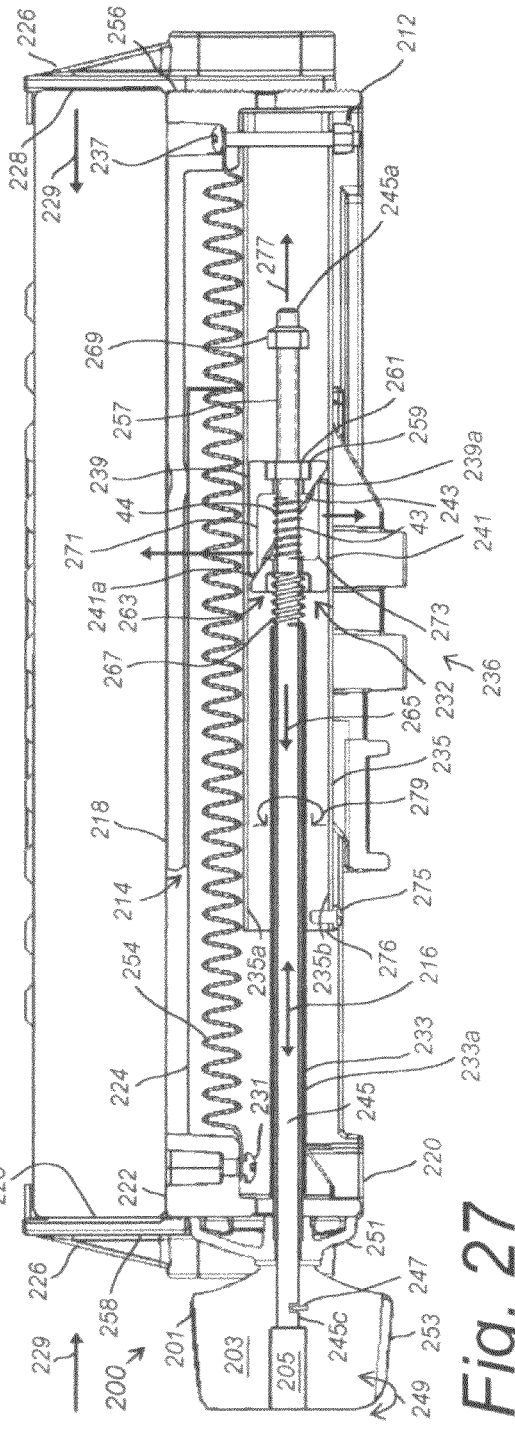
FIG. 27 is a cross-section through the alternative locking platform that illustrates by example and without limitation an engaged interlock mechanism alternatively permitting actuation or turning of an actuator knob a direction that actuates engagement of the wedge locking mechanism.

FIG. 27 illustrates that, when rotationally coupled between the actuator knob 203 and coupler rod 245, the engaged interlock mechanism 247 alternatively permits actuation or turning (arrow 249) of the actuator knob 203 in another opposite direction that actuates engagement of the wedge locking mechanism 232. Accordingly, by turning (arrow 279) of the coupler rod 245 relative to the rotationally constrained compression nut 261, the compression nut or other threaded means 261 is drawn (arrow 265) toward the collar 251 or other portion of the end face 258 of the second body portion 220, which in turn draws the farther wedge 239 toward the actuator knob 203 and the end face 258 of the second body portion 220, thereby forcing the farther wedge 239 against the nearer wedge 241. The nearer wedge 241 is constrained by the male spacer 233 and stiff compensation spring 267 from moving toward the end face 258 of the second body portion 220. Thus, when the farther wedge 239 is forced into the nearer wedge 241, the cooperating wedges 239, 241 are forced to move crosswise to one another and laterally of the female containment tube 235, as indicated by the outwardly pointing arrows. The crosswise motion drives the cooperating wedges 239, 241 laterally against opposing inner walls 235a, 235b of the female containment tube 235 and jam or wedge them there against. The cooperating wedges 239, 241 thus cause the locking mechanism 232 to fix the coupler rod 245 lengthwise of the female containment tube 235, whereby the second body portion 220 cannot be expanded away from the first body portion 212 so that the accessory device cannot be removed from the mounting platform 200 without first loosening or disengaging the wedge locking mechanism 232, as discussed herein.

FIG. 28 illustrates by example and without limitation the key lock 205 being unlocked for disengaging the interlock mechanism 247 between the actuator knob 203 and the coupler 245 so that turning (indicated by arrow 249) of actuator knob 203 causes the knob 203 to freely rotate independently of the unlocked coupler 245 and without driving the same. Accordingly, the turning (arrow 279) of the coupler rod 245 relative to the rotationally constrained compression nut 261 does not occur.

FIG. 29 illustrates by example and without limitation another embodiment of the lengthwise drive mechanism 253, wherein the actuator knob 203 of the telescoping interlocking mechanism 201 is a cam device rotatably coupled to the near end 245c of the coupler rod 245. The actuator cam 203 is operable in a known manner for engaging the near end 245c of the coupler rod 245 such that turning (indicated by arrow 281) of actuator cam 203 drives the interlocked coupler rod 245 in a sliding manner along the first direction 216 through the lengthwise passage 233a of the male sleeve or tube spacer 233 relative to the reaction surface 206 of the collar 251 affixed to the end face 258 of the second body portion 220. Such sliding motion of the interlocked coupler rod 245 drives the far wedge 239 relative to the near wedge 241 in the manner of the cooperating wedges 34, 36 relative to the lengthwise wedge locking mechanism 32 as discussed herein.

The actuator cam 203 is further operable in a known manner for engaging an unlockable interlock mechanism 283 in a known manner such that the actuator cam 203 cannot be operated to move the coupler rod 245. By example and without limitation, the interlock mechanism 283 is unlockably coupled between the actuator cam 203 and a portion 285 of the second body portion 220, such as a portion of the end face 258. Here, the unlockable interlock mechanism 283 is illustrated by example and without limitation as a pad lock coupleable between a handle portion 287 of the actuator cam 203 and the portion 285 of the second body portion 220. Other unlockable interlock mechanisms 283 are also contemplated for interlocking the actuator cam 203 relative to the second body portion 220 and may be substituted without deviating from the scope and intent of the invention.

Optionally, the intervening decoupler 208 is provided between the actuator cam 203 and the reaction surface 206 of the collar 251 or other portion of the end face 258.

Optionally, the far end portion 245a of the coupler rod 245 includes the threaded portion 257, and the mating compression nut 261 is threadedly mated therewith for adjusting a position of the farther wedge 239 relative to the inner male spacer 233. The mating compression nut 261 is optionally moved along the threaded portion 257 closer to the near end 245c of the coupler rod 245, which causes activation of the actuator cam 203 to expand the cooperating wedges 239, 241 more outwardly in the direction of the arrows for more tightly jamming them against the tube walls 235a, 235b. Else, the mating compression nut 261 is instead optionally moved along the threaded portion 257 toward the far end 245a, which causes activation of the actuator cam 203 to expand the cooperating wedges 239, 241 less outwardly in the direction of the arrows for less tightly jamming them against the tube walls 235a, 235b, but also makes easier turning (arrow 281) of actuator cam 203 for activating or engaging the cooperating wedges 239, 241 so that less strength is required.

Figure 30:
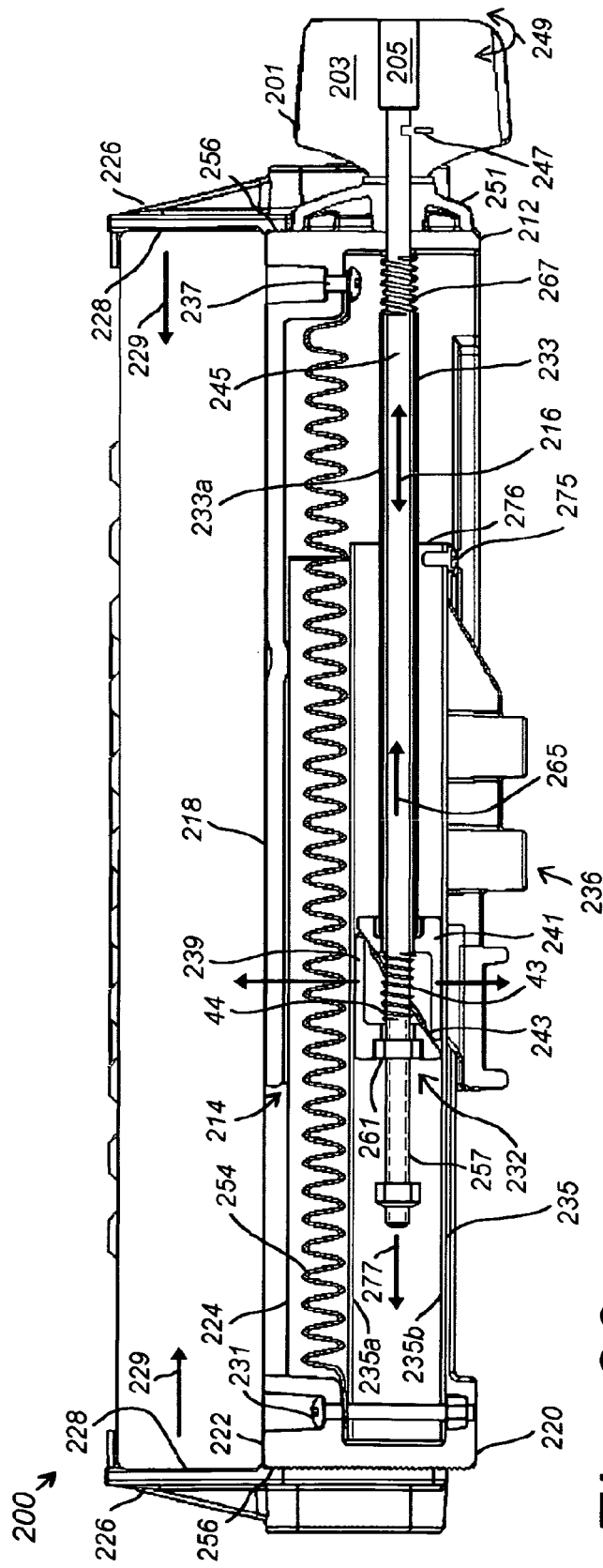
FIG. 30 is a cross-section through the alternative locking platform that illustrates the keyed telescoping interlocking mechanism being reversible between the first and second body portions.

FIG. 30 illustrates the mounting platform 100 invention embodied as a locking platform 200 having the keyed telescoping interlocking mechanism 201 is reversible between the first and second body portions 212, 220, whereby the female containment tube 235 is coupled to the second body portion 220, while the coupler rod 245 is coupled to the first body portion 212 with the actuator 203 being operable relative to the end face 256 of the first body portion 212. Thus, such reversal of the telescoping interlocking mechanism 201 relative to the first and second body portions 212, 220 is also contemplated and may be substituted without deviating from the scope and intent of the invention.

FIG. 30 also illustrates the compensation spring 267 being inserted between the male spacer 233 and the end face 256 of the first body portion 212, such inverted placement of the compensation spring 267 being also contemplated without deviating from the scope and intent of the invention.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. A mounting platform, comprising:
cooperating frame members being relatively movable along a first direction, at least one of the frame members comprising a device mounting surface positioned relative to the first direction, wherein the frame members further comprise opposing clamping surfaces for retaining a device on the device mounting surface; and
an interlocking mechanism coupled between the frame members, the interlocking mechanism comprising:
a female member coupled to a first one of the frame members, a male member coupled to a second one of the frame members, the male member being slidable relative to the female member, a reaction surface formed relative to the second frame member,
an actuator coupled to the male member and having a drive surface thereon that is positioned adjacent to the reaction surface of the second frame member, the male member being responsive to a motion of the drive surface of the actuator relative to the reaction surface of the second frame member for moving relative to the female member, and
an expandable locking mechanism coupled to the male member and being nominally slidable within the female member, the expandable locking mechanism comprising cooperating wedge members that are relatively slidable along a plane of mutual contact that is inclined relative to a longitudinal axis of the male member and being responsive to the motion of the drive surface of the actuator relative to the reaction surface of the second frame member for expanding within the female member.

2. The mounting platform of claim 1 wherein the interlocking mechanism further comprises a disengageable interlock mechanism coupled between the actuator and the male member.

3. The mounting platform of claim 1 wherein the interlocking mechanism further comprises a sleeve positioned between the reaction surface of the second frame member and the expandable locking mechanism, the male member being slidable in the sleeve.

4. The mounting platform of claim 3 wherein the interlocking mechanism further comprises a compression compensator positioned between the sleeve and one of the reaction surface and the expandable locking mechanism.

5. A mounting platform, comprising:
cooperating frame members being relatively movable along a first direction, the cooperating frame members comprising:
a female frame member having a first device mounting surface with a first clamping surface adjacent to a track that is aligned along the first direction, and
a male frame member having a second device mounting surface with a second clamping surface adjacent to a slide that is configured to slidably engage the track for relative motion along the first direction, wherein the second clamping surface cooperates with the first clamping surface for retaining a device on the device mounting surfaces;
an elastic biasing member engaged between the male and female frame members;
a reaction surface formed on one of the male and female frame member;
an interlocking telescoping security mechanism coupled between the male and female frame member, the interlocking telescoping mechanism comprising:
an elongated male member that is slidable within an elongated female member, the male member being extended from the reaction surface,
an actuator adjacent to the reaction surface and releasably coupled for moving the elongated male member relative to the reaction surface, and
first and second cooperating wedges that are slidable within the female member and are positioned therein adjacent to a portion of the male member that is positioned within the female member, the wedges being responsive to motion of the elongated male member relative to the reaction surface for slidingly expanding within the female member along a plane of mutual contact that is inclined relative to a longitudinal axis of the male member; and a releasable interlock mechanism engageable between the actuator and the elongated male member.

6. The mounting platform of claim 5 wherein the telescoping security mechanism further comprises an elongated male spacer slidable within the elongated female member and positioned between the reaction surface and the cooperating wedges.

7. The mounting platform of claim 6 wherein the elongated male spacer further comprises a lengthwise passage formed therethrough, the elongated male member being slidable therein.

8. The mounting platform of claim 6 wherein:
the elongated male member further comprises a threaded portion opposite from the reaction surface and adjacent to one of the wedges distal from the reaction surface;
a threaded interface between the threaded portion of the elongated male member and the distal wedge; and
the actuator is further releasably coupled for rotating the elongated male member relative to the reaction surface and the threaded interface between the threaded portion of the elongated male member and the distal wedge.

9. The mounting platform of claim 8 wherein the telescoping security mechanism further comprises a compression compensator positioned between the elongated male spacer and the cooperating wedges.

10. The mounting platform of claim 9 wherein the telescoping security mechanism further comprises a decoupler operable between the first and second wedges, the decoupler having a compression resistance associated therewith that is less than a compression resistance associated with the compression compensator.

11. A mounting platform, comprising:
cooperating frame members being relatively movable along a first direction, the cooperating frame members comprising:
  a female frame member formed with a first device mounting surface with a first clamping surface and a track that is aligned along the first direction, and
  a male frame member formed with a second device mounting surface with a second clamping surface opposing the first clamping surface and a slide that is slidably engaged with the track for relative motion along the first direction, wherein the first clamping surface and second clamping surface cooperate for retaining a device on the device mounting surfaces;
an elastic biasing member coupled to each of the male and female frame members, the elastic biasing member urging the male frame member to approach the female frame member along the first direction;
a reaction surface positioned adjacent to a first one of the male and female frame members; and
an interlockable telescoping mechanism coupled between the male and female frame member, the interlocking telescoping mechanism comprising:
  a tubular female member coupled to a second one of the male and female frame member,
  an actuator adjacent to the reaction surface and rotatable relative thereto,
  a coupler rod having a first portion releasably coupled to the actuator and a second portion extended within the tubular female member, the coupler rod being movable responsively to a rotation of the actuator relative to the reaction surface,
  cooperating wedges that are slidable within the tubular female member and are positioned therein adjacent to the second portion of the coupler rod,
  cooperating inclined sliding surfaces formed on the wedges in an inclined relationship to a longitudinal axis of the coupler rod, and
  at least a first one of the wedges being responsive to a motion of the coupler rod for sliding the inclined surface thereof relative to the inclined surface of a second one of the wedges and crosswise of the tubular female member.

12. The mounting platform of claim 11, further comprising a releasable interlock mechanism engageable between the actuator and the first portion of the coupler rod.

13. The mounting platform of claim 12, further comprising a spacer positioned between the reaction surface and the cooperating wedges.

14. The mounting platform of claim 13, further comprising a compression spring positioned between the spacer and either one of the reaction surfaces and the cooperating wedges.

15. The mounting platform of claim 14, further comprising a compression spring positioned between the cooperating wedges.

16. The mounting platform of claim 15 wherein:
the actuator is further rotatable relative to the reaction surface by rotation about the longitudinal axis of the coupler rod,
the coupler rod is further rotatable about its longitudinal axis responsively to a rotation of the actuator, and
the interlocking telescoping mechanism further comprises a threaded interface between the second portion of the coupler rod and the first one of the wedges.

17. A mounting platform, comprising:
cooperating frame members, comprising opposing clamping surfaces and being relatively movable along a first direction, at least one of the frame members comprising a device mounting surface positioned relative to the first direction, wherein the clamping surface cooperate for retaining a device on the device mounting surface; and
an interlocking mechanism coupled for adjustably interlockably positioning the cooperating frame members relative to the first direction, the interlocking mechanism comprising:
  a female containment member coupled to a first one of the frame members,
  a male member coupled to a second one of the frame members, the male member being movable within the female containment member,
  a reaction surface formed relative to the second frame member,
  an actuator coupled to the male member and positioned adjacent to the reaction surface of the second frame member, and
  wherein the male member is further responsive to a motion of the actuator relative to the reaction surface of the second frame member for moving relative to the female member, and
  cooperating wedge members positioned between the male member and the female containment member, the cooperating wedge members being relatively slidable along a plane of mutual contact that is inclined relative to a longitudinal axis of the female containment member for expanding within the female containment member, the cooperating wedge members being relatively slidable responsive to moving of the male member within the female containment member.

18. The mounting platform of claim 17 wherein the interlocking mechanism further comprises a disengageable interlock mechanism coupled between the actuator and the male member.

\* \* \* \* \*